(12) United States Patent
Schaffner et al.

(10) Patent No.: US 6,176,335 B1
(45) Date of Patent: Jan. 23, 2001

(54) POWER WHEELCHAIR

(75) Inventors: Walter E. Schaffner, Shavertown; James P. Mulhern, Hunlock Creek; Stephen J. Antonishak, Alden, all of PA (US)

(73) Assignee: Pride Mobility Products, Corporation, Exeter, PA (US)

(*) Notice: Under 35 U.S.C. 154(b), the term of this patent shall be extended for 0 days.

(21) Appl. No.: 08/742,972

(22) Filed: Nov. 1, 1996

Related U.S. Application Data

(63) Continuation-in-part of application No. 29/056,607, filed on Jul. 3, 1996, now Pat. No. Des. 397,645.

(51) Int. Cl.⁷ .................................................. B60K 1/00

(52) U.S. Cl. .................. 180/65.1; 180/65.1; 180/250.1; 180/907; 280/657

(58) Field of Search ............................. 180/65.1, 907, 180/6.5, 65.6, 6.48, 65.5, 250.1; 280/638, 657, 658; 297/423.28, 423.34, 423.36, DIG. 4, DIG. 10; 301/70.41, 5.1, 5.21

(56) References Cited

U.S. PATENT DOCUMENTS

| | | |
|---|---|---|
| D. 305,521 | 1/1990 | Wiatrak et al. . |
| D. 365,786 | 1/1996 | Peterson . |
| D. 365,787 | 1/1996 | Peterson et al. . |
| D. 365,788 | 1/1996 | Peterson . |
| 2,986,200 | 5/1961 | Nobile .................... 155/30 |
| 3,104,112 | 9/1963 | Crail ...................... 280/5.2 |
| 3,191,990 | 6/1965 | Rugg et al. ............... 297/83 |
| 3,580,591 | 5/1971 | Coffey et al. ............ 280/5.32 |
| 3,855,654 | 12/1974 | Pivacek . |
| 3,876,041 | 4/1975 | Pivacek . |
| 3,901,527 | 8/1975 | Danziger et al. .......... 280/34 |
| 3,902,758 | 9/1975 | Pivacek . |
| 3,917,312 | 11/1975 | Rodaway .................. 280/242 |
| 3,930,551 | 1/1976 | Cragg .................... 180/65 R |
| 3,952,822 | 4/1976 | Udden et al. . |
| 3,953,054 | 4/1976 | Udden et al. . |
| 4,082,348 | 4/1978 | Haury . |
| 4,108,449 | 8/1978 | Rhodes .................. 280/5.28 |
| 4,140,192 | * 2/1979 | Sharpe ................... 180/907 |
| 4,387,325 | 6/1983 | Klimo . |
| 4,424,873 | 1/1984 | Terlaak . |
| 4,431,076 | 2/1984 | Simpson . |
| 4,500,102 | 2/1985 | Haury . |
| 4,511,825 | 4/1985 | Klimo . |
| 4,513,832 | 4/1985 | Engman . |
| 4,538,857 | 9/1985 | Engman . |

(List continued on next page.)

FOREIGN PATENT DOCUMENTS

| | | |
|---|---|---|
| 1018906 | 10/1977 | (CA) . |
| 1207867 | 7/1986 | (CA) . |
| 1233100 | 2/1988 | (CA) . |
| 2703727 | 3/1978 | (DE) . |
| 9203878 | 6/1992 | (DE) . |
| 29614531 | 1/1997 | (DE) . |
| 0268960 | 6/1988 | (EP) . |
| 0338689 | 10/1989 | (EP) . |
| 0 339 500 B1 | 3/1993 | (EP) . |
| 0312969 | 3/1993 | (EP) . |

(List continued on next page.)

OTHER PUBLICATIONS 16 page brochure entitled "Bodypoint Designs Winter Catalog 1995–1996" Copyright 1995.

*Primary Examiner*—Richard M. Camby
(74) *Attorney, Agent, or Firm*—Seidel, Gonda, Lavorgna & Monaco, PC

(57) ABSTRACT

A power wheelchair has a frame, a seat connected to the frame, a pair of drive wheels connected to the frame and rotatable about transverse axis below a portion of the seat supporting the wheelchair occupant's thighs and at least one ground-engaging idler wheel connected to the frame behind the drive wheels.

28 Claims, 18 Drawing Sheets

U.S. PATENT DOCUMENTS

| | | | |
|---|---|---|---|
| 4,546,764 | 10/1985 | Gerber | 128/33 |
| 4,555,121 | 11/1985 | Lockard et al. . | |
| 4,595,212 | 6/1986 | Haury et al. . | |
| 4,634,941 | 1/1987 | Klimo . | |
| 4,641,848 | 2/1987 | Ayers | 280/242 |
| 4,655,471 | 4/1987 | Peek | 280/242 |
| 4,671,257 | 6/1987 | Kaiser et al. | 128/25 |
| 4,721,321 | 1/1988 | Haury et al. . | |
| 4,724,559 | 2/1988 | Bly et al. . | |
| 4,805,925 | 2/1989 | Haurey et al. . | |
| 4,811,945 | 3/1989 | Disbrow et al. | 272/73 |
| 4,813,693 | 3/1989 | Lockard et al. . | |
| 4,834,413 | 5/1989 | Patel et al. | 280/304.1 |
| 4,840,390 | 6/1989 | Lockard et al. . | |
| 4,887,830 | 12/1989 | Fought et al. . | |
| 4,962,551 | 10/1990 | Bly | 4/480 |
| 4,967,864 | 11/1990 | Boyer et al. | 180/65.1 |
| 4,981,305 | 1/1991 | Lockard et al. . | |
| 4,989,890 | 2/1991 | Lockard et al. . | |
| 5,033,793 | 7/1991 | Quintile . | |
| 5,036,938 * | 8/1991 | Blount et al. | 180/907 |
| 5,038,430 | 8/1991 | Bly . | |
| 5,044,647 | 9/1991 | Patterson | 280/250.1 |
| 5,076,390 | 12/1991 | Haskins | 280/250.1 |
| 5,094,310 | 3/1992 | Richey et al. . | |
| 5,113,959 | 5/1992 | Mastov et al. | 180/11 |
| 5,121,938 | 6/1992 | Gross et al. . | |
| 5,134,731 | 8/1992 | Quintile et al. | 11/611 |
| 5,145,020 | 9/1992 | Quintile et al. . | |
| 5,154,251 | 10/1992 | Fought . | |
| 5,170,826 | 12/1992 | Carstensen et al. . | |
| 5,180,025 | 1/1993 | Yeh et al. | 180/65.5 |
| 5,183,133 | 2/1993 | Roy et al. | 180/252 |
| 5,186,793 | 2/1993 | Michaels | 204/59 |
| 5,195,803 | 3/1993 | Quintile . | |
| 5,203,610 | 4/1993 | Miller . | |
| 5,209,509 | 5/1993 | Gay et al. | 280/304.1 |
| 5,263,728 | 11/1993 | Patel et al. . | |
| 5,294,141 | 3/1994 | Mentessi et al. . | |
| 5,340,139 | 8/1994 | Davis | 280/304.1 |
| 5,341,517 | 8/1994 | Bly | 4/236 |
| 5,351,774 | 10/1994 | Okamato | 180/65.1 |
| 5,366,037 | 11/1994 | Richey . | |
| 5,378,045 | 1/1995 | Siekman et al. . | |
| 5,413,187 | 5/1995 | Kruse et al. | 180/65.1 |
| 5,419,571 | 5/1995 | Vaughan | 280/250.1 |
| 5,435,404 | 7/1995 | Garin, III . | |
| 5,442,823 | 8/1995 | Siekman et al. . | |
| 5,445,233 | 8/1995 | Fernie et al. . | |
| 5,513,899 | 5/1996 | Michaels et al. | 297/452.41 |
| 5,522,734 | 6/1996 | Goertzen | 439/500 |
| 5,531,284 | 7/1996 | Okamoto | 180/65.1 |
| 5,540,297 | 7/1996 | Meier | 180/65.5 |
| 5,573,260 | 11/1996 | Peterson et al. | 280/250.1 |
| 5,575,348 | 11/1996 | Goertzen et al. | 180/65.6 |
| 5,592,997 | 1/1997 | Ball . | |
| 5,669,619 | 9/1997 | Kim | 280/250.1 |
| 5,690,185 | 11/1997 | Sengel | 180/65.1 |
| 5,697,465 | 12/1997 | Kruse | 180/65.1 |
| 5,727,802 | 3/1998 | Garven, Jr. et al. | 280/250.1 |
| 5,772,226 * | 6/1998 | Bobichon | 180/907 |
| 5,816,614 | 10/1998 | Kramer, Jr. et al. | 280/775 |
| 5,823,621 | 10/1998 | Broadhead | 297/354.13 |
| 5,836,654 | 11/1998 | DeBellis et al. | 297/452.41 |
| 5,848,658 | 12/1998 | Pulver | 180/65.1 |
| 5,851,018 | 12/1998 | Curran et al. | 280/250.1 |
| 5,853,059 | 12/1998 | Goertzen et al. | 180/65.6 |
| 5,899,475 | 5/1999 | Vergaeg et al. | 280/250.1 |
| 5,944,131 * | 8/1999 | Schaffner et al. | 180/65.1 |
| 5,964,473 | 10/1999 | Degonda et al. | 280/250.1 |

FOREIGN PATENT DOCUMENTS

| | | |
|---|---|---|
| 2215054 | 8/1974 | (FR) . |
| 2399822 | 3/1979 | (FR) . |
| 2399822 | 9/1979 | (FR) . |
| 2455886 | 5/1980 | (FR) . |
| 1447961 | 1/1976 | (GB) . |
| 2132954 | 7/1984 | (GB) . |
| 2141980 | 9/1985 | (GB) . |
| 2192595 | 1/1988 | (GB) . |
| 2199291 | 7/1988 | (GB) . |
| 2224980 | 5/1990 | (GB) . |
| 2265868 | 10/1993 | (GB) . |
| 58-63575 | 4/1983 | (JP) . |
| WO 87/06205 | 10/1987 | (WO) . |
| WO 90/05515 | 5/1990 | (WO) . |
| WO 90/05516 | 5/1990 | (WO) . |
| WO 90/06097 | 6/1990 | (WO) . |
| WO 91/17077 | 11/1991 | (WO) . |
| WO 95/28903 | 11/1995 | (WO) . |
| WO 96/15000 | 5/1996 | (WO) . |
| WO9615752 | 5/1996 | (WO) . |

\* cited by examiner

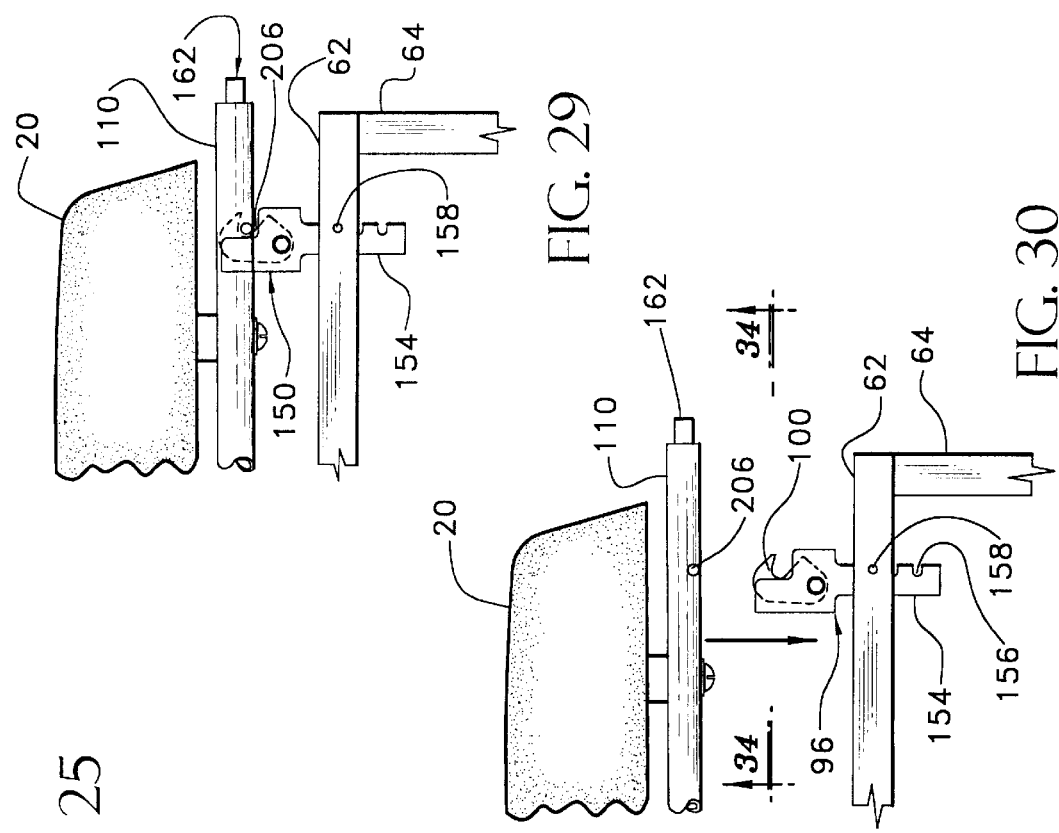
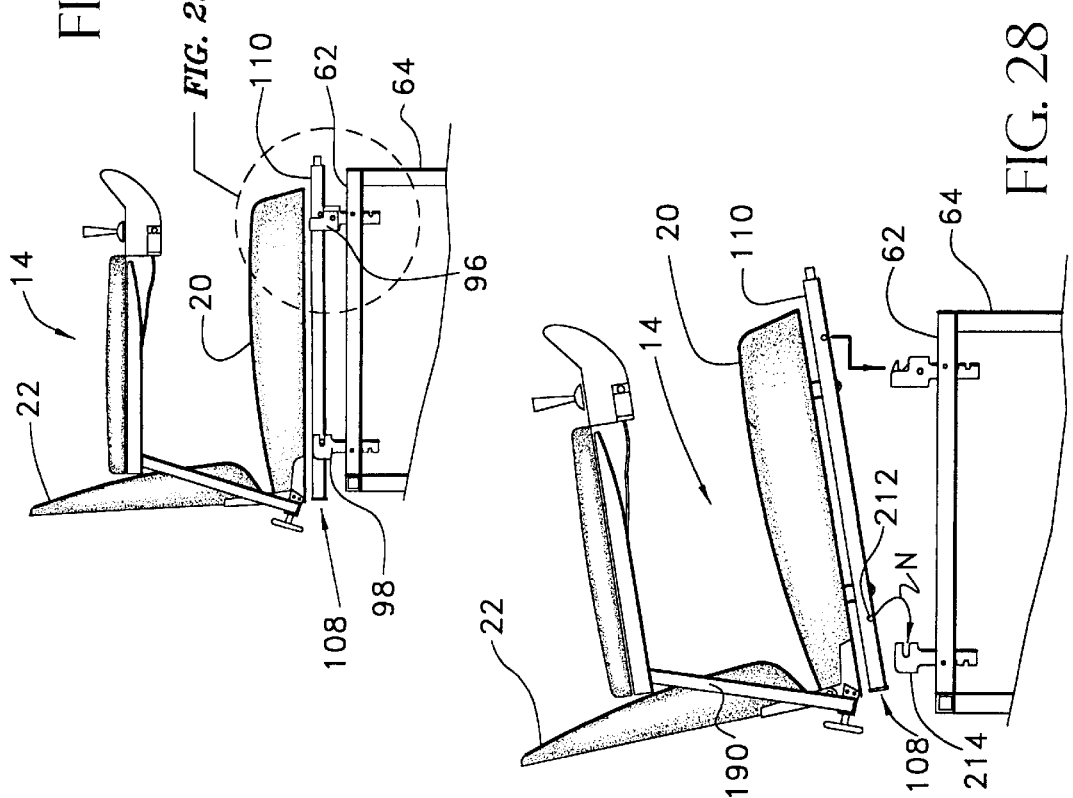

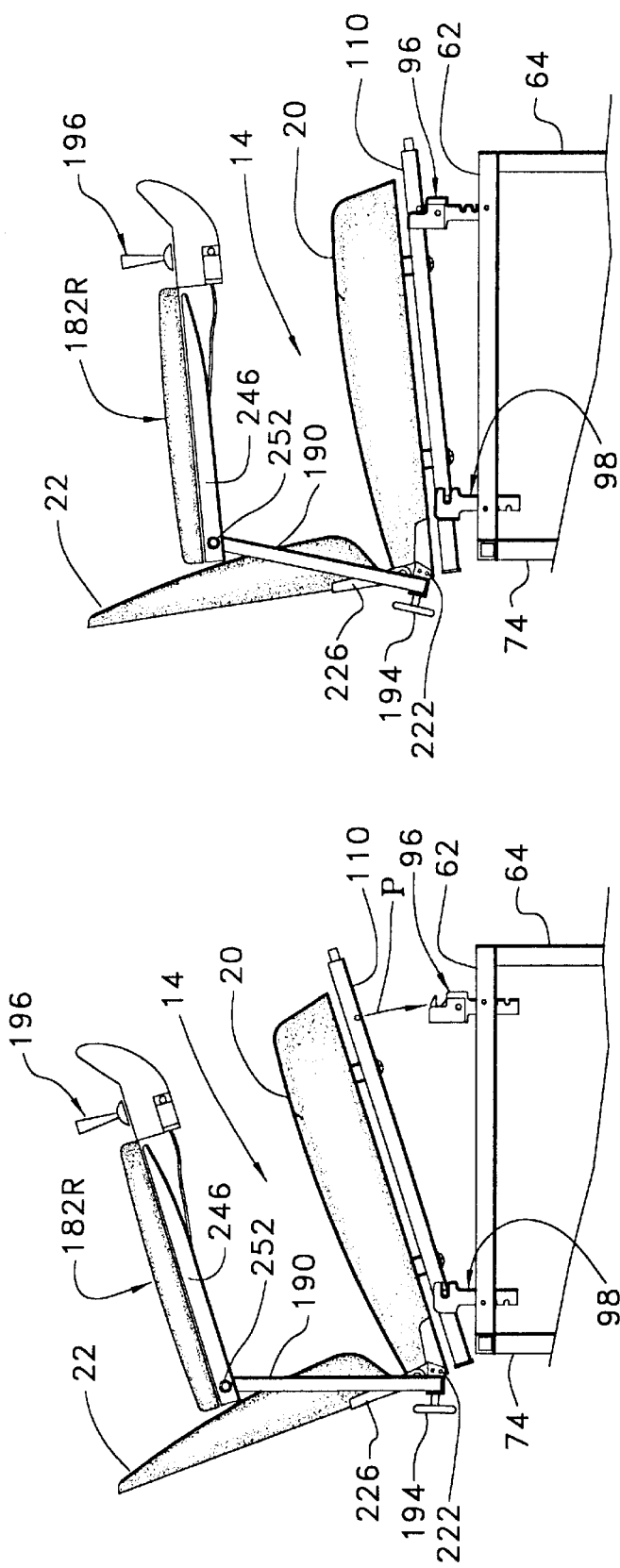

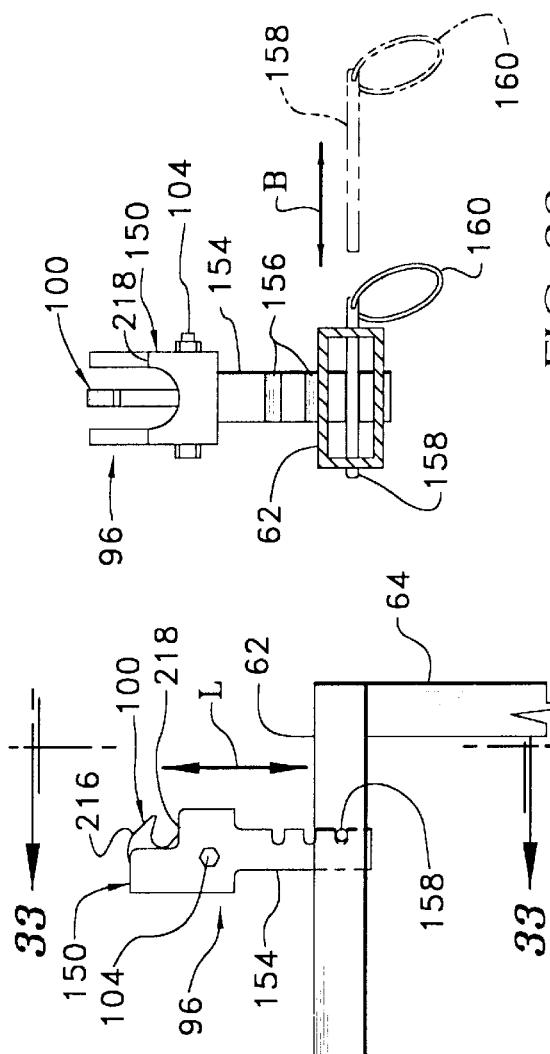
FIG. 31
FIG. 32
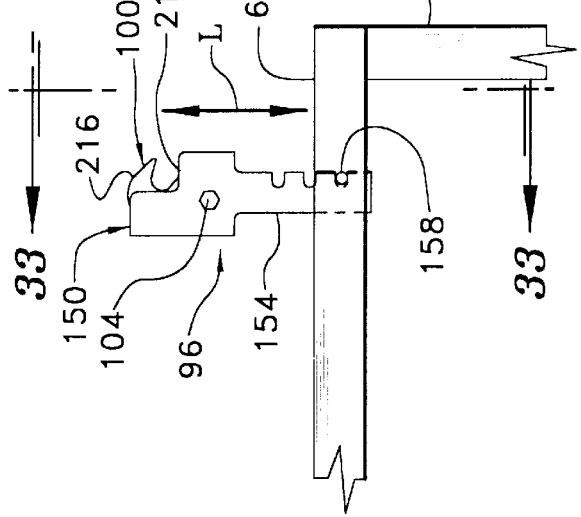
FIG. 33
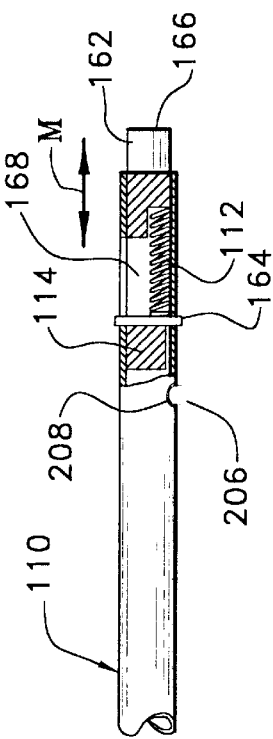
FIG. 34
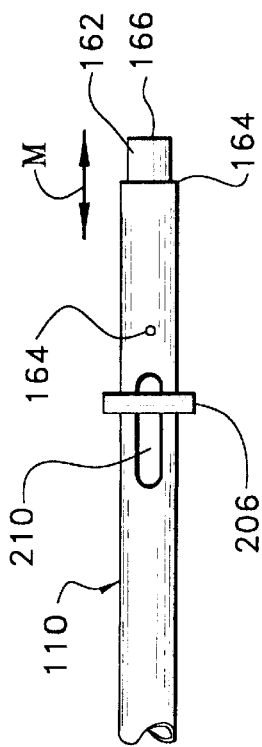
FIG. 35

POWER WHEELCHAIR

CROSS-REFERENCE TO RELATED PATENT APPLICATION

This patent application is a continuation-in-part of U.S. patent application Ser. No. 29/056,607, filed Jul. 3, 1996 now U.S. Pat. No. 0,397,645 in the name of Walter Schaffner and assigned to Pride Health Care, Inc.

BACKGROUND OF THE INVENTION

1. Field of the Invention

This invention relates to wheelchairs, particularly to powered wheelchairs, for use by handicapped and disabled persons.

2. Description of the Prior Art

Power wheelchairs are known and have been the subject of increasing development efforts to provide handicapped and disabled persons with independent mobility to assist handicapped and disabled persons in leading more normal lives.

Power wheelchairs known heretofore have, for the most part, resembled conventional, manual wheelchairs; indeed, many such power wheelchairs have merely been conventional wheelchairs equipped with motors. Use of such power wheelchairs sometimes results in the user filing a stigma associated therewith in that unthoughtful persons may view the power wheelchair user in a quizzical or even offensive manner.

Additionally, known power wheelchairs suffer in that they tend to be large and are not particularly maneuverable. These large, difficult to maneuver power wheelchairs present difficulties for the power wheelchair user in navigating within conventional dwellings which have not been modified to accommodate such conventional power wheelchairs. Typical conventional rear wheel drive power wheelchairs which are little more than manual wheelchairs equipped with motors, have turning circles of about 72 inches in diameter, whereas typical front wheel drive power wheelchairs known heretofore have, for the most part, turning circles in the neighborhood of 52 inches in diameter. These turning circles are too big for the user of a conventional power wheelchair to reverse the wheelchair direction by turning the wheelchair around within the corridor or hallway of a conventional office building or most homes.

Dual drive motor power wheelchairs are known; one is illustrated in U.S. Pat. No. 5,540,297. Other power wheelchairs are disclosed in U.S. Pat. Nos. 4,513,832; 4,538,857; 5,094,310; 5,145,020 and 5,366,037.

Front wheel drive power wheelchairs are scold by Permobile, Inc. in Woburn, Mass. and typically have the driving front wheels at the extreme forward end of the vehicle chassis thereby requiring substantial space in order to turn the front wheel drive power wheelchair because the axis of rotation of the chair, upon turning, is at the mid-point of the drive wheel axes, which is at the extreme forward end of the chair.

SUMMARY OF THE INVENTION

In one of its aspects this invention provides a power wheelchair having a frame, a seat supported by the frame, a pair of drive wheels connected to the frame and preferably rotatable about a transverse axis under a central portion of the seat and a pair of idler wheels preferably connected to the frame behind the drive wheels.

In another of its aspects this invention provides a power wheelchair including a frame, a seat and latch means for retaining the seat preferably in fixed disposition on the frame upon application of downward force to the seat such as by a wheelchair user occupying the wheelchair seat and for releasing the seat from the frame responsively to application of preferably manually generated and applied preferably axially-oriented force to said latch means, all without use of tools.

In yet another of its aspects this invention provides a power wheelchair including a frame, a seat preferably having cushion and back portions, with the seat being mounted on the frame, a pair of drive wheels connected to the frame and rotatable about transverse axes below a portion of the seat cushion supporting a chair occupant's thighs, where each drive wheel is preferably independently suspended respecting the frame and the wheelchair preferably includes a pair of idler wheels connected to the frame behind the seat.

In yet another of its aspects this invention provides a power wheelchair including a frame, a seat supported by the frame, a pair of drive wheels rotatable about transverse axes preferably below a central portion of the seat, motors for rotating respective ones of the drive wheels with the motors being preferably connected to the drive wheels for unitary motion therewith respecting the frame upon the connected drive wheel encountering an obstacle, and means for preferably independently mountingly suspending the drive wheel/motor combinations from the frame.

In yet another of its aspects this invention provides a power wheelchair which has a frame, a seat, a pair of drive wheels rotatable about transverse axes preferably below the seat, motors for driving respecting ones of the drive wheels, at least one battery for powering the motors and a decorative body for preferably concealing the batteries and the motor(s) with the body preferably resting on the frame. The frame preferably supports the seat by extending preferably through the body. The body is preferably manually directly liftable off of the frame in the absence of the seat preferably without use of tools.

In yet another of its aspects this invention provides a power wheelchair including a frame, a seat, a pair of drive wheels rotatable about transverse axes below the seat, motors for driving respective ones of the drive wheels, at least one battery for powering the motors and means preferably operable responsively to preferably manually generated force for releasably connecting the seat to the frame, where the preferably manually generated force is preferably axially oriented and is most preferably in the form of a pair of parallel force vectors.

In yet another of its aspects this invention provides a power wheelchair having a frame, a seat and means for manually adjustably positioning seat height and/or tilt respecting the frame, without the use of tools, including front and rear seat support members which are longitudinally spaced from one another, extend upwardly from the frame and are movable upwardly respecting the frame independently of one another together with means for manually fixing the front and rear seat support members independently at selected ones of a plurality of positions to the frame.

In yet another of its aspects this invention provides a power wheelchair including a frame, a seat having a cushion, a back and arms on either side of and above the cushion and means for adjustably transversely positioning the arms separated from one another along a continuum of positions thereby to adjustably select the effective width of the seat, where the means for adjustably positioning the arms includes an arm support base, arm support extensions connected to the arm support base and movable transversely therealong and means for adjustably fixing the arm support members respecting the arm support base at a selected location along said continuum of positions along the arm support base by application of manual force thereto without the use of tools.

In yet another of its aspects this invention provides a power wheelchair having a frame and a seat and providing in combination the aforementioned means for manually adjustably positioning seat-tilt respecting the frame without the use of tools and means for adjustably transversely positioning arms of the seat separated one from another along a continuum of positions thereby to adjustably select effective width of the seat.

BRIEF DESCRIPTION OF THE DRAWINGS

FIG. 25 is a broken side view of the seat and an upper portion of the frame of the power wheelchair illustrated in FIGS. 14 through 18 showing means operable responsively to manually generated force for releasably connecting the seat to the frame.

FIG. 26 is a broken side view of the seat and an upper portion of the frame of the power wheelchair as illustrated in FIG. 25 showing the seat support structure partially engaged with the frame.

FIG. 27 is a broken side view of the seat and an upper portion of the frame similar to FIGS. 25 and 26 showing the wheelchair seat mounted on the frame in a position tilted back relative to the position illustrated in FIG. 25.

FIG. 28 is a broken side view of the seat and an upper portion of the frame, similar to FIGS. 25 through 27, depicting operation of means for releasably connecting the seat to the frame.

FIG. 29 is a side view taken at the position of circle 29 in FIG. 25 illustrating a latch portion of means for releasably connecting the seat to the frame.

FIG. 30 is a side view taken at the same position as FIG. 29 illustrating the seat subframe ready to engage a latch portion of means for releasably connecting the seat to the frame.

FIG. 31 is a side view of the latch illustrated in FIGS. 29 and 30, depicting movement of latch parts.

FIG. 32 is a view of the portion of the frame and the latch illustrated in FIGS. 29 and 30, taken at the same position, illustrating vertical adjustment of a seat support member.

FIG. 33 is a front elevation of the structure illustrated in FIG. 32 taken at arrows 33—33 in FIG. 32.

FIG. 34 is a partially broken view of a portion of the seat subframe taken at arrows 34—34 in FIG. 30.

FIG. 35 is a partially broken side view of the structure illustrated in FIG. 34.

FIG. 36 is a side view of an arm of a wheelchair seat as illustrated generally in FIGS. 25 through 28 showing the manner in which the arm may be swung upwardly.

FIG. 37 is an enlarged view of structure illustrated in FIG. 36 taken at circle 37 in FIG. 36.

FIG. 38 is an enlarged view of structure illustrated in FIG. 20 taken at the position indicated by the circle in FIG. 20.

Figure 1:
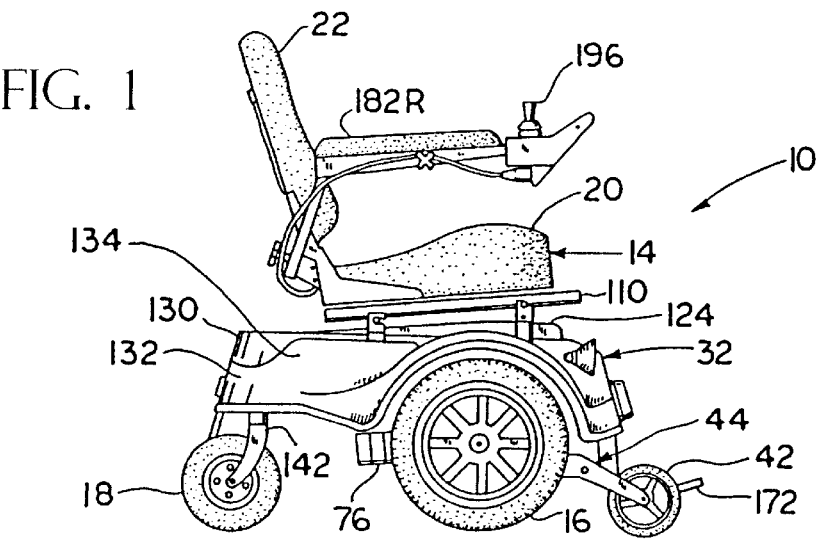
FIG. 1 is a right side view of a prototype power wheelchair manifesting aspects of the invention.

DETAILED DESCRIPTION OF THE PREFERRED EMBODIMENTS AND BEST MODE KNOWN FOR PRACTICING THE INVENTION IN ACCORDANCE WITH 35 USC 112

Referring to the drawings in general and to FIGS. 14 through 20 in particular, a power wheelchair manifesting aspects of the invention is illustrated therein and is designated generally 10. Power wheelchair 10 includes a frame, best illustrated in FIG. 19, which is designated generally 12 and a seat designated generally 14 supported by frame 12. Power wheelchair 10 further includes a pair of drive wheels each of which has been designated generally 16, which are rotatably connected to frame 12 and are rotatable about transverse axes under a central portion of seat 14.

An important aspect of this invention is the selected geometry and configuration of the components of the power wheelchair. The inventors in developing the configuration and geometry of the power wheelchair recognized that human beings have a center of perception located within the skull, which the inventors refer to as the cranial center of perception. This cranial center of perception is in one aspect the point a person perceives to define the axis of rotation of the person's head when one turns onie's head without tilting.

The cranial center of perception is generally perceived to be located behind one's eyes, centrally located from left to right within the head and at a front to back location approximately even with the ear opening.

The cranial center of perception provides a point of reference for all human beings respecting body movement. All human beings find body movements to be easier where such movements are relative to and are with respect to the cranial center of perception of the individual.

The inventors, recognizing the desirability of all human beings to have a relatively stationary cranial center of perception as a reference point for body movement, further recognized that a power wheelchair with the driving axis of the drive wheels essentially vertically aligned with the wheelchair user's cranial center of perception makes the power wheelchair much, much easier to maneuver for a wheelchair user, especially a disabled or handicapped wheelchair user. This has been accomplished by providing in the power wheelchair a seat having a cushion portion for supporting a wheelchair user's thighs and the lower portion of the wheelchair user's buttocks. The seat further includes a back portion for supporting the wheelchair user's back, With the seat having cushion and back portions, the wheelchair user is positioned in a seated upright position when using the wheelchair.

In this position the wheelchair user's cranial center of perception is located above the drive wheels. of the power wheelchair since the drive wheels, specifically the axis about which the drive wheels are rotated, is below a central portion of the wheelchair seat, specifically below a central portion of the cushion. This arrangement results in the drive wheel axis being at substantially a longitudinally common location with the center of cranial perception when the wheelchair user occupies the wheelchair seat.

As is apparent from the drawings, drive wheels 16 of power wheelchair 10 are connected to frame 12 so that each drive wheel 16 rotates about a transverse axis which is below a portion of a cushion portion 20 of the power wheelchair seat designated generally 14, and specifically below the portion of cushion 20 which supports the power wheelchair occupant's thighs. As is apparent from the drawings, drive wheels 16 are rotatable about transverse axes which are forward of the longitudinal mid-point of the wheelchair seat 14 and specifically are rotatable about transverse axes which are forward of the longitudinal mid-point of the seat cushion 20.

Seat 14 is preferably mounted on frame 12 proximate the longitudinal mid-point of frame 12. As is further apparent from the drawings, drive wheels 16 are connected to frame 12 and rotatable with respect thereto about a transverse axis which is under a central portion of frame 12 which is adapted to support seat 14. As is further apparent from the drawings, drive wheels 16 which are rotatably connected to frame 12 are rotatable about a transverse axis which is preferably under a central portion of seat 14. The axis of drive wheels 16 is between the mid-point of seat 12 and the seat forward extremity and is preferably closer to the mid-point of seat 14 than to the longitudinal extremity thereof.

Cushion portion 20 of seat 14, and especially the forward portion of cushion 20 is the portion of cushion 20 which supports a seat occupant's thighs.

Figure 19:
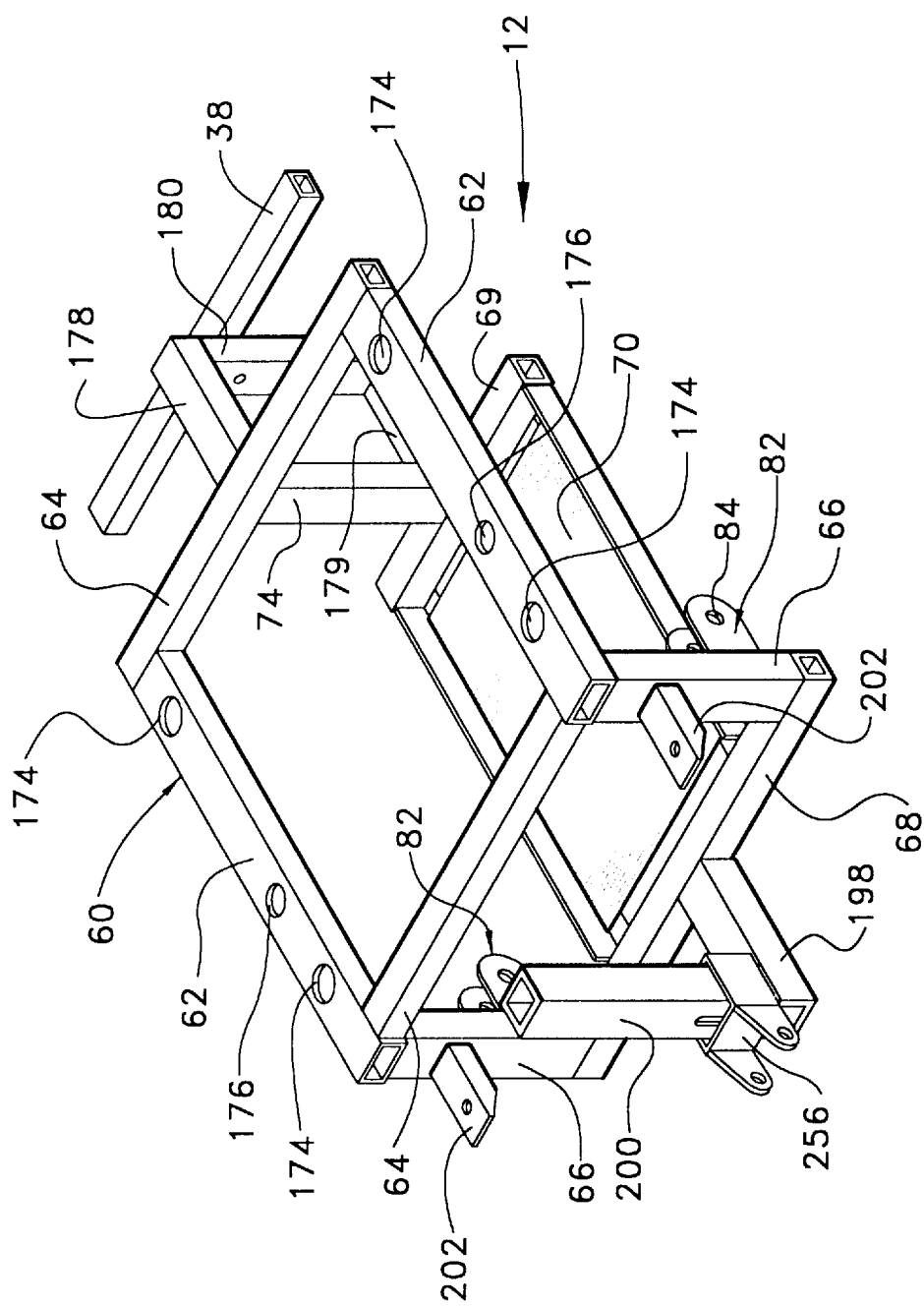
FIG. 19 is an isometric view of the frame of the power wheelchair illustrated in the drawing figures.

Frame 12 is illustrated isometrically in FIG. 19 and has an upper rectangular frame portion designated generally 60 which includes left and right longitudinally extending tubular upper members 62 and forward and rear transversely extending tubular upper members 64. Members 62 and 64 are preferably welded together. As illustrated in FIG. 19, frame 12 is preferably fabricated of hollow tubular rectangular cross-section steel members which are welded together.

Frame 12 further includes a pair of forward vertically downwardly extending members 66 which are preferably welded to and extend downwardly from forward extremities of longitudinally extending tubular upper members 62 as illustrated in FIG. 19. A transversely extending forward lower cross-member 68 is preferably welded to lower extremities of downwardly extending members 66 and extends therebetween.

Preferably welded to and extending vertically downwardly from the center of a rear transversely extending tubular upper member 64 is a rear vertically downwardly extending member 74 forming a portion of frame 12.

A pan 70 for carrying electrochemical means, for powering the motors rotating drive wheels 16, in the form of one or more batteries 32, is preferably welded along its forward edge to forward transversely extending lower cross-member 68. A rear transversely extending lower cross-member 69 is welded to the lower extremity of rear vertically downwardly extending member 74. The rear edge of pan 70 is welded to the forward facing surface of rear transversely extending lower cross-member 69, which is of length equal to the width of pan 70; rear transversely extending lower cross-member 69 is not as long in the transverse direction as transversely extending cross-members 64, 68.

Longitudinally extending tubular upper members 62 preferably have apertures 174 formed therein, preferably by drilling or stamping. Apertures 174 receive front and rear upwardly extending seat support members which provide for manual height and tilt adjustment of the power wheelchair seat without use of tools. Between apertures 174 in longitudinally extending tubular upper members 62 are apertures 176 which are provided for mounting a spring-strut portion of the independent drive wheel suspension means of wheelchair 10.

Frame 12 further includes upper and lower longitudinally extending central tubular members 178, 179 respectively. Upper member 178 is preferably welded to and extends rearwardly from the center of rear upper transversely extending tubular member 64. Lower longitudinally extending central tubular member 179 is preferably welded to and extends rearwardly from the center of the rearwardly facing surface of rear transversely extending cross-member 69, immediately below the point of welding connection between rear vertically downwardly extending member 74 and rear transversely extending lower cross-member 69.

Extending vertically between longitudinally extending central upper and lower tubular members 178, 179 is outboard vertically extending tubular member 180, which is preferably secured to the rear extremities of longitudinally extending members 178, 179 by welding.

Frame 12 further includes a longitudinally extending forward tubular extension member 198 which is secured to transversely extending lower forward cross-member 68 preferably at the center thereof, preferably by welding.

Frame 12 yet further preferably includes a forward upstanding extension member 200 secured by welding to the forward extremity of forward tubular extension member 198 and extending transversely upwardly therefrom as illustrated in FIG. 19.

Frame 12 still yet further preferably includes a pair of eye portions designated generally 82 in FIG. 19 which preferably consist of a pair of parallel plates affixed to rearwardly facing surfaces of respective vertically downwardly extending forward members 66. The plates constituting eye portions 82 include apertures 84 formed therein where apertures 84 are aligned in respective ones of plates forming eye portion 82 so that each pair of plates may receive shafts for independent suspension of drive wheels from eye portions 82 as described below. Eye portions 82, specifically the parallel plate portions thereof, are preferably formed from single pieces of metal by bending the pieces of metal into a U-shaped bracket where the upstanding portions of the "U" define the plates of eye portion 82. The preferred one piece, U-shaped bracket construction of eye portion 82 is visible in FIG. 16.

Frame 12 preferably yet further includes a pair of forwardly extending pedestals 202 which are secured to forwardly facing surfaces of forward vertically downwardly extending members 66, preferably by welding. Pedestals 202 are preferably secured at positions on members 66 somewhat below the upper extremities thereof, as illustrated in FIG. 19. Forwardly extending pedestals 202 provide points of attachment for spring-strut-beam combinations 44 which govern arcuate upward movement of anti-tip wheels 42 relative to frame 12. The spring-strut-beam combinations 44 and anti-tip wheels 42 are not illustrated in FIG. 19 but are shown in FIGS. 14, 16 through 18 and 21 through 24.

Pan 70 is preferably welded to a forward portion of rear vertically downwardly extending member 74 as well as to a rear portion of transversely extending lower tubular cross-member 68. The preferably welded, box-like construction of frame 12 as illustrated in FIG. 19 provides a rigid, high strength frame for power wheelchair 10.

Figure 14:
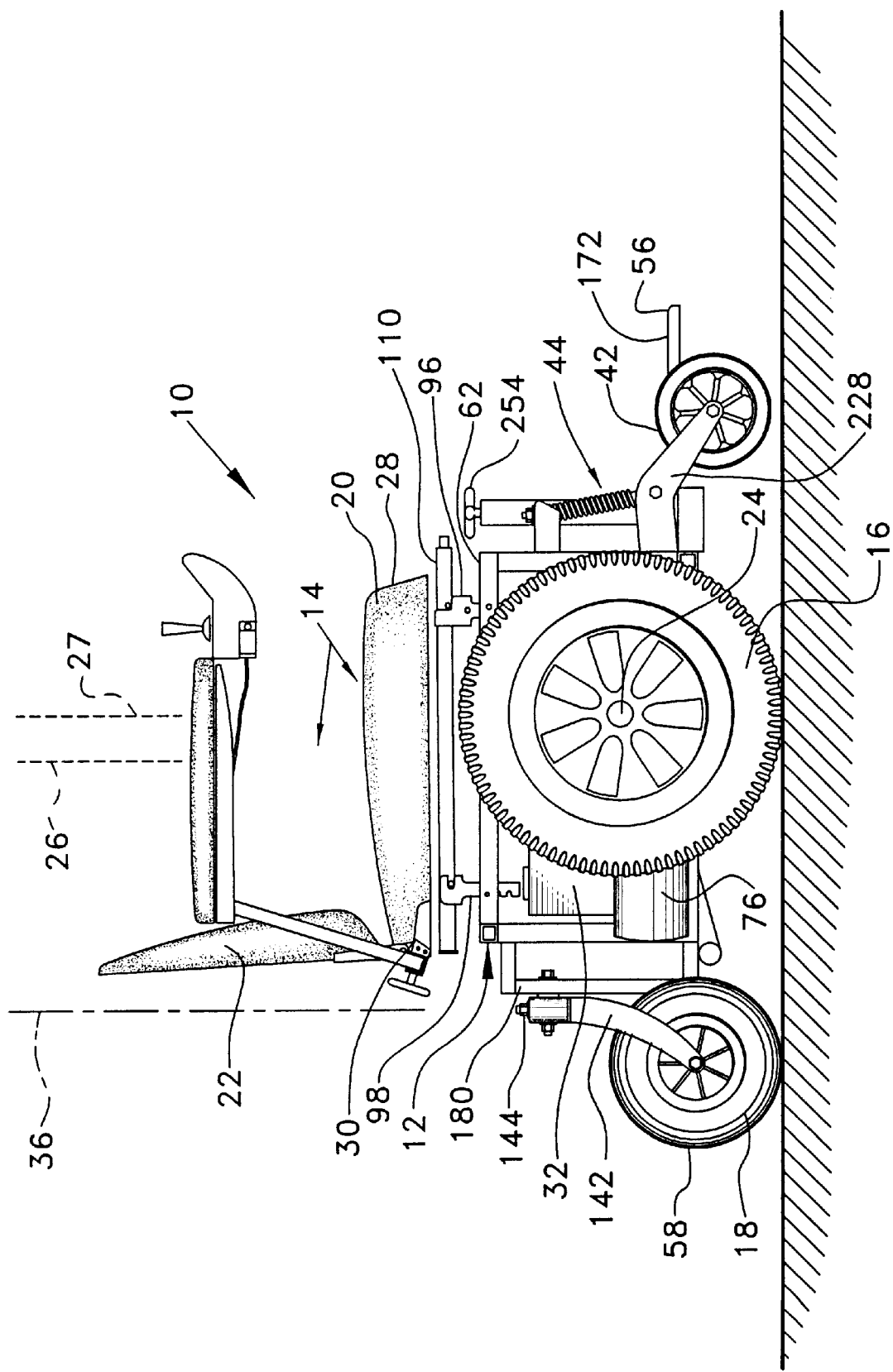
FIG. 14 is a side view of an enhanced preferred embodiment of a power wheelchair manifesting many aspects of the invention in common with the prototype power wheelchairs as generally illustrated in FIGS. 1 through 13 as described above but with the power wheelchair body removed to reveal internal structure and mechanical details.

As illustrated in FIG. 14, drive wheels 16 are preferably oriented and positioned respecting frame 12 so that the axes of rotation of drive wheels 16 are between the longitudinal mid-point and forward extremity of seat 14. Most desirably the axis of rotation of drive wheels 16 is closer to the mid-point of seat 16 than to the forward longitudinal extremity of seat 16.

Seat 14 preferably includes a cushion portion 20 and a back portion 22. In FIG. 14 the longitudinal mid-point of seat 14, specifically the longitudinal mid-point of seat cushion 20, is identified 26. The forward longitudinal extremity of seat 14 is identified 28 while the rear longitudinal extremity of seat 14 and specifically seat cushion 20 is identified 30. The axis of rotation of drive wheels 16 is identified 24. In FIG. 14 the longitudinal mid-point 26 of seat 14, specifically of cushion 20 of seat 14, is indicated by both a lead line from an indicator numeral and by a dotted vertical line. The longitudinal location of the axes of rotation of drive wheels 16 is indicated by dotted vertical line 27 in FIG. 14.

Figure 15:
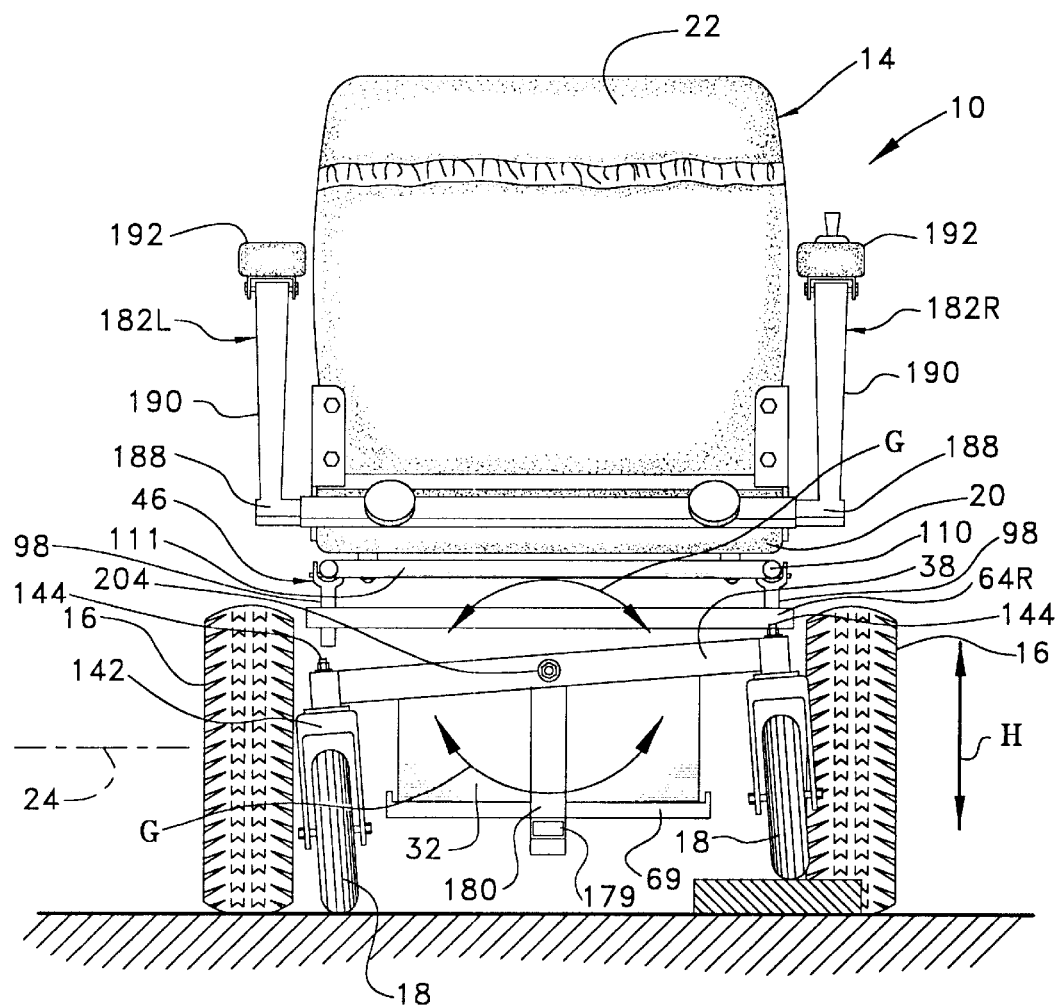
FIG. 15 is a rear view of the power wheelchair illustrated in FIG. 14 with the power wheelchair body similarly removed to reveal internal structure and mechanical details.
Figure 16:
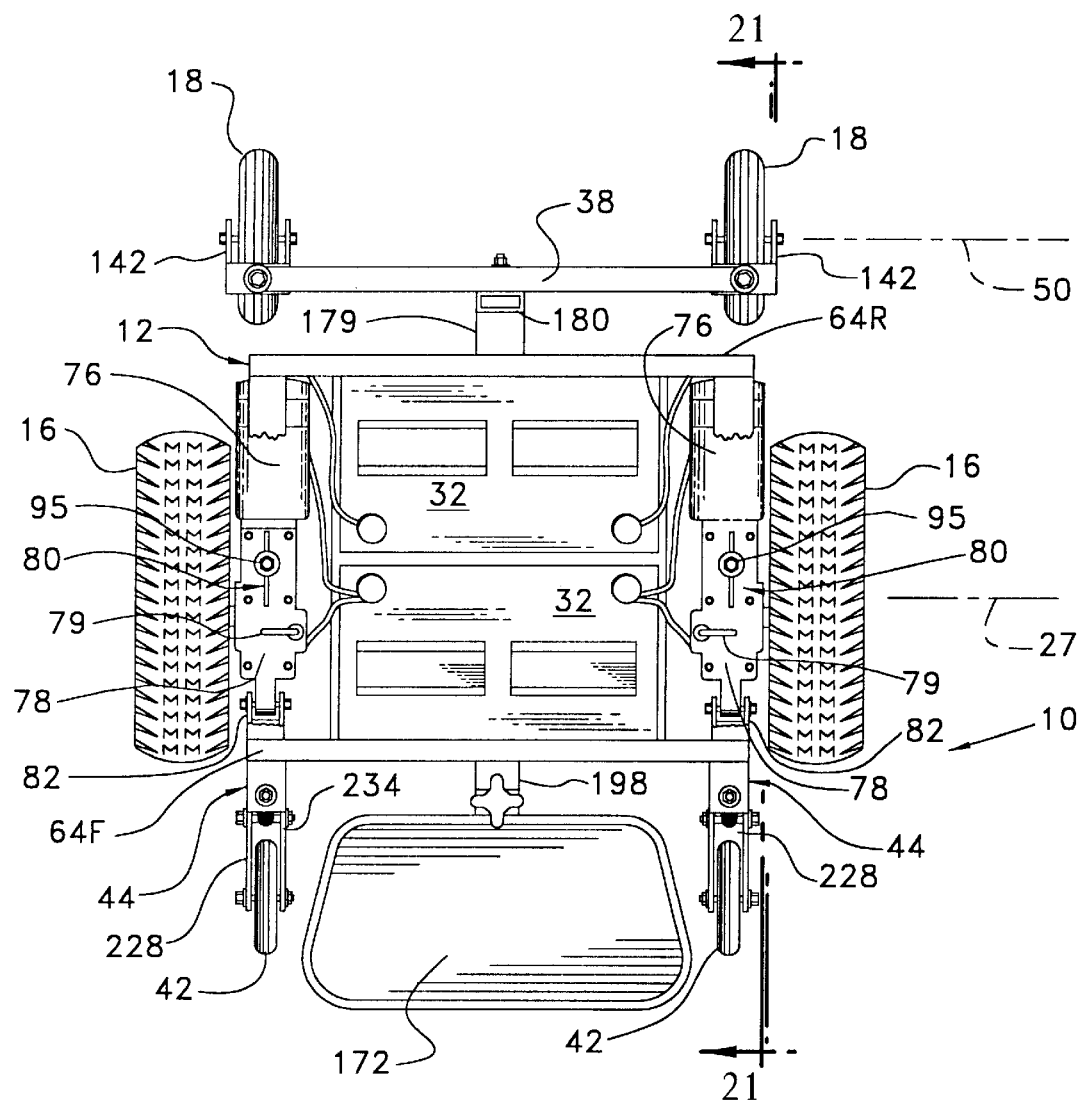
FIG. 16 is a top view of the power wheelchair illustrated in FIGS. 14 and 15 but with the power wheelchair seat and body removed to reveal internal structure and mechanical details.

Power wheelchair 10 further includes at least one battery, which has been designated generally 32, carried by frame 12, specifically by pan 70 as illustrated in FIG. 15. Power wheelchair 10 further includes motors 76 powered by one or more batteries 32 for driving drive wheels 16. Each drive wheel 16 preferably has an drive motor 76 associated therewith as illustrated in FIG. 16.

As best illustrated in FIGS. 14 and 15, power wheelchair 10 further includes a pair of idler wheels 18 which are the rear ground engaging wheels of power wheelchair 10; drive wheels 16 are the forward ground engaging wheels of power wheelchair 10. Hence the power wheelchair in the preferred embodiment of the invention illustrated in the drawings is a front wheel drive power wheelchair. Note, however that many aspects of this invention are not limited to front wheel drive power wheelchairs. In the preferred embodiment of the invention rear ground engaging wheels 18 are caster-type wheels.

The front wheel drive power wheelchair in the preferred embodiment of the invention as illustrated in the drawings, particularly in the mechanical configuration illustrated in FIGS. 14 through 19, provides a front wheel drive power wheelchair with the drive wheels positioned towards the longitudinal center of the power wheelchair vehicle. This configuration concentrates, and is believed to effectively maximize, weight placed on drive wheels 16. A power wheelchair instructed in accordance with FIGS. 14 through 20 and having dimensions as set forth herein as representing the preferred embodiment of the invention, when carrying a 160 pound passenger has about eighty-two percent (82%) of the total weight of the power wheelchair and passenger carried by drive wheels 16.

The configuration illustrated in the drawings, particularly in FIGS. 14 through 19, positioning a large amount of total chair and passenger weight over drive wheels 16, provides several benefits: Overall traction is increased. With increased traction, better obstacle climbing ability results, increasing overall capability and usability of the power wheelchair. Additionally, with increased traction, deceleration is more positive and more predictable. This is an important safety factor in light of the fact that most if not all of the users of power wheelchairs manifesting the preferred embodiments of the invention will be handicapped and disabled persons.

With increased traction also comes superior straight line stability of the power wheelchair. The mass centralization created by the battery placement and the user position in the power wheelchair contributes to straight line stability by reducing the "pendulum effect" present in many prior art front wheel drive power wheelchairs, where the user and battery weight are both behind the pivot axis of the drive wheels. The "pivot axis" of the drive wheels means the vertical axis about which the power wheelchair turns when the power wheelchair is turned in as tight a turning radius as possible.

Increased traction further results in extremely accurate response of the power wheelchair control joystick inputs provided by the wheelchair user. This translates into more predictable and positive handling and a much easier learning curve for the power wheelchair user when the user is first becoming accustomed to the power wheelchair.

Yet another benefit of the geometry and configuration of the components in the preferred embodiment of the invention, as illustrated in FIGS. 14 through 19, is an extremely tight turning radius. This allows the user of the power wheelchair to gain access to and to turn around in confined areas such as those encountered in hallways, bathrooms, small kitchens and office areas. In the preferred embodiment of the invention as illustrated in FIGS. 14 through 18 the power wheelchair has an extremely small footprint. Placement of the drive wheels near the center of the power wheelchair results in the power wheelchair having a turning radius of only nineteen and one-half inches (19½") in the preferred embodiment of the invention.

As illustrated in FIGS. 15 and 16, idler wheels 18 located at the rear of power wheelchair 10 are mounted to frame 12 and are pivotable about vertical axes identified 36 in FIG. 14. Idler wheels 18 are not powered and are desirably caster-type wheels. Idler wheels 18 are connected to frame 12 behind drive wheels 16 and, preferably, behind seat 14.

As illustrated in FIG. 15 rear idler wheels 18 are connected to a transverse beam 38 via U-shaped spindles 142 which connect to transverse beam 38 via conventional bearing assemblies 144. With this arrangement U-shaped spindles and hence rear idler wheels 18 ended arrow H in FIG. 15 where this displacement is effectuated by idler wheel 18 encountering the obstacle.

As illustrated in FIGS. 14, 15, 17, 18, 20 and 25 through 35, power wheelchair 10 further includes means for releasably supporting seat 14 on frame 12 where frame 12 includes upstanding extension portions for supporting seat 14. These upstanding portions are designated generally 46 in the drawings and specifically include rear upstanding seat support members designated 98 and forward upstanding seat support members 96, which are shown in FIGS. 14 and 15 and especially in FIG. 17.

Rear seat support members 98 extend upwardly, preferably vertically, from frame 12 and are transversely spaced one from another. Similarly, forward seat support members 96 extend upwardly, preferably vertically, from frame 12 and are transversely spaced one from another. Rear seat support members 98 preferably include slots, which are preferably horizontally disposed, and which preferably face forward seat support members 96. These slots are visible in FIGS. 17, 18, 25, 26 and 28 but have not been numbered, to enhance drawing clarity.

As best illustrated in FIGS. 31, 32 and 33, forward seat support members 96 preferably include hooking members 100 which are preferably pivotally mounted in U-shaped frame portions 150 of forward seat support members 96. Hooking members 100 are mounted on shafts 104 to be movable by rotation respecting frame portion 150 of forward seat support member 96 as illustrated generally in FIG. 31, where arrow A denotes rotational movement of hooking are pivotable about vertical axes 36 upon wheelchair 10 turning and/or one of rear idler wheels 18 encountering an obstacle such as illustrated in FIG. 15.

Rear idler wheels 18 are rotatably mounted within U-shaped spindles 142 for rotation within the spindles about horizontal axes 50 as illustrated in FIG. 16.

As illustrated in FIG. 15, transverse beam 38 is pivotally connected to frame 12, specifically to the upper portion of outboard vertically extending tubular rear frame member 180. The point of pivotal connection of transverse beam 38 to vertically extending outboard rear frame member 180 is designated 204. Pivotal connection provided at 204 is effectuated using conventional bearings together with a pin journeled in the bearing for pivotally connecting beam 38 to vertical extending frame member 180. Member 180 extends upwardly from a lower longitudinally extending frame rear extension member 179 which in turn extends rearwardly from a rear transversely extending lower cross-member 69 as illustrated in FIG. 19.

Pivotal mounting of transverse beam 38 to vertically extending rear frame member 180 provides a smoother ride in the event wheelchair 10 encounters a bump. As illustrated in FIG. 15, where the right hand one of rear idler wheels 18 has been illustrated encountering an obstacle, as right hand idler wheel 18 rides over the obstacle, beam 38 rotates about pivotal connection 204 as indicated by double ended arrows G in FIG. 15. Vertical displacement of right hand idler wheel 18 is depicted by double member 100. In FIG. 31 a hooking member 100 is shown in phantom lines having rotated in the direction of arrow A from its normal operational position illustrated in solid lines in FIG. 31.

Hooking members 100 are adapted to rotate rearwardly, as indicated by arrow A in FIG. 31, to an orientation such that mouth portions of the hooking members preferably move at least to a horizontal orientation so that seat 14 may be removed from seat support members 46 and specifically from forward upstanding seat support members 96.

Springs 102 are provided about shafts 104 to bias hooking members 100 forwardly respecting FIG. 31, in a direction opposite to that indicated by arrow A, to an orientation at. which the mouth portion of a slot in hooking member 100 is preferably facing below horizontal as illustrated in solid lines in FIG. 31. The mouth portion of hooking member 100 is designated generally as 106 by arrow in FIG. 31 and is defined by an opening between a tip 152 of hooking member 100 and a remaining surface of the slot formed in hooking member 100.

As depicted schematically by double ended arrow L in FIG. 32, upstanding seat support portions 46, specifically forward and rear upstanding seat support members 96, 98, are movable upwardly respecting the remainder of frame 12 and specifically respecting longitudinally extending tubular member 62 to which respective forward and rear upstanding seat support members 96, 98 are connected. Forward and rear seat support members 96, 98 are vertically adjustably positionable respecting longitudinally extending tubular upper member 62 independently of one another thereby to permit adjustment of height and/or tilt of seat 14, specifically cushion portion 20 of seat 14, respecting frame 12.

Height adjustment of forward and/or rear upstanding seat support members may be performed manually, without use of tools. This is facilitated by mounting of forward and rear upstanding seat support members 96, 98 in apertures formed in tubular members 62 as depicted generally in FIGS. 32 and 33. Upstanding seat support members 96, 98 have shaft portions 154 which are preferably cylindrical in configuration to preferably slidably reside in the apertures 174 defined by holes in the upper and lower portions of tubular members 62. Preferably, horizontal semi-circular bottomed grooves 156 are formed in shafts 154 and are vertically spaced from one another and aligned at a common position on the periphery of shaft 154, as illustrated in FIG. 31.

Side walls of tubular members 62 are drilled. to receive pins 158 which slidably reside within the holes drilled in the side walls of tubular member 62. Each pin 158 is sized to fit in a selected one of horizontal semi-circular bottomed grooves 156 formed in shaft portion 154, as illustrated generally in FIGS. 32 and 33. One pin 158 is provided for each of upstanding seat support members 96, 98 to retain the same in place respecting an associated tubular member 62.

To adjust vertical position of one of seat support members 96, 98, the associated pin 158 is removed. This is normally accomplished by pulling on a pull ring 160 which is preferably attached to pin 158 by passage through an aperture at one end of pin 158 as indicated generally by double ended arrow B in FIG. 33. Once pin 158 has been removed from a given horizontal semi-circular bottomed groove 156 and is outside tubular member 62, the associated forward or rear seat support member 96, 98 may be moved vertically, either up or down as desired; this vertical adjustment is indicated schematically by double ended arrow L in FIG. 32.

When the seat support member 96 or 98 is in the desired position, pin 158 is replaced. This is done by pushing pin 158 through the aligned apertures in the parallel side walls of tubular member 62 and into position in the desired semi-circular bottomed groove 156 in shaft portion 154 of the associated forward or rear seat support member 96, 98, as depicted by double ended arrow B in FIG. 33. This secures seat support member 96 or 98 against rotation since pin 158 is precluded from rotating about the axis of shaft 154 by interference with the walls of tubular member 62. Seat support member 96 or 98 is precluded from moving vertically, being held in place respecting vertical movement by pin 158 residing within a preferably semi-circular bottomed groove 156 formed in shaft portion 154 of an associated seat support member 96 or 98.

FIGS. 32 and 33 depict the interaction of a forward upstanding seat support member 96 and pin 158 and the manner of effectuating vertical position adjustment of upstanding seat support member 96; the same structure is provided for rear seat support members 98. Hence, front and rear seat support members 96, 98 may be positioned vertically respecting frame 12 independently one of another. This permits cushion portion 20 of seat 14 to be affixed to frame 12 in a level position, which is effectuated by seat support members 96, 98 being at a common height respecting longitudinally extending tubular upper member 62 in which forward and rear seat support members 96, 98 reside. Cushion 20 may be tilted back; this is effectuated by having upstanding forward seat support members 96 positioned higher respecting associated longitudinally extending tubular upper member 62 of frame 12 than rear upstanding seat support members 98 respecting associated longitudinally extending tubular upper member 62 of frame 12.

Further alternatively, cushion 20 may be positioned tilted forward by having rear upstanding seat support members 98 positioned higher respecting associated longitudinally extending tubular upper member 62 of frame 12 than forward upstanding seat support members 96. Because the vertical position of upstanding seat support members 96, 98 may be adjusted manually, without the use of tools, this permits an attendant or therapist to change the seating position for the power wheelchair user at the home or other premises where the power wheelchair is used; it is not necessary to take the power wheelchair to a dealer or other service facility or to a health care facility to adjust as illustrated in FIGS. 25 through 30, seat height/tilt position.

Seat 14 is preferably mounted on and may be considered to include a subframe designated generally 108 which provides a part of means for connecting seat 14, specifically cushion 20 of seat 14, to frame 12 of power wheelchair 10 so that seat 14 is releasably supported above frame 12 and may be removed from frame 12 by hand, without the use of tools.

Subframe 108 preferably includes a pair of circular cross-section longitudinally extending tubular members designated 110 affixed to the bottom of cushion 20 of seat 14. Longitudinally extending tubular members 110 are visible in FIGS. 14, 15, 17, 18, 20 and 25 through 30 and are shown partially broken in FIGS. 34 and 35. Subframe 108 further preferably includes a pair of transverse tubular members, longitudinally separated from one another, extending between and secured to inwardly facing surfaces of longitudinally extending members 110. These transversely extending members are numbered 111 and are best visible in FIGS. 15 and 20 of the drawings.

Seat 14, specifically cushion portion 20 of seat 14, is secured to subframe 108 via screws passing through tubular members 111 and into the bottom of cushion portion 20 of seat 14. Tubular members 111 are separated from the lower, downwardly facing surface of cushion 20 of seat 14 by thermoplastic washers which are illustrated in FIG. 15. Neither the screws which pass through the thermoplastic washers to secure tubular members 111 to the bottom portion of cushion portion 20 of seat 14 nor the thermoplastic washers themselves have been numbered in FIG. 15, to aid drawing clarity.

Longitudinally extending tubular members 110 preferably house pushbuttons 114 having coil springs 112 therewithin as illustrated in FIGS. 34 and 35. Pushbutton 114 has a portion 162 which extends longitudinally out of tubular member 110 and an longitudinally facing end surface 166 adapted for receiving axial manually generated force to move pushbutton 114.

Pushbutton 114 is of unitary construction. The section view illustrated in FIG. 35 is a vertical section respecting FIG. 34 and it is for this reason that pushbutton 114 in FIG. 35 appears to be a two part member. In fact, pushbutton 114 is a single, unitary member having an opening thereon appearing as an open space in FIG. 35 which registers with slot 210 illustrated in FIG. 34.

A roll pin 164 extends through the walls of tubular member 110 and limits axial travel of pushbutton 114.

The open void appearing in pushbutton 114 in FIG. 35, which open void has been designated 168, registers with slot 210 and also with a space within pushbutton 114 occupied by spring 112. Spring 112 is maintained in compression between roll pin 164, which is stationery respecting pushbutton 114 and an unnumbered internal shoulder portion of pushbutton 114 against which spring 112 abuts at its right hand extremity viewed in FIG. 35.

With spring 112 being under compression, a user applying manually generated axially oriented force to exterior surface 166 urges pushbutton 114 to the left in FIGS. 34 and 35. The left hand surface of pushbutton 114, at the end oppositely from surface 166, passes over forward transverse rod 206 since there is a slight clearance provided between the surface of pushbutton 114 facing rod 206 and rod 206 itself. This clearance permit pushbutton 114 moving to the left to contact hooking member 100 thereby rotating hooking member 100 in the direction indicated by arrow A, against the bias supplied thereto by spring 102. When pushbutton 114 has traveled the full permissible length of its longitudinal travel within tubular member 110 and a shoulder portion at the right hand end of space 168 in FIG. 35 has contacted roll pin 164, pushbutton 114 has pushed hooking member 100 sufficiently that hooking member 100 has rotated into a position at which the mouth of the slide 106 in FIG. 31 is slightly open upwardly, as illustrated by the phantom line depiction of hooking member 100 in FIG. 31. This permits the user to lift seat 14 vertically upwardly thereby removing seat 14 from forward seat support member 96 without the use of tools.

Springs 112 are under compression. When manual force is applied to exterior button portion 166 in the axial direction indicated generally by double ended arrow M in FIGS. 34 and 35 pushbutton 114 moves to the left in FIGS. 34 and 35, against the resilient force applied to pushbutton 114 as a result of contact with spring 112.

Pushbutton 114 is relieved at the bottom, as illustrated in FIG. 35, to provide clearance above a transverse rod 206 which is fixedly retained within an arcuate cut-out 208 formed in the bottom of longitudinally extending tubular member 110 as illustrated in FIG. 35. Rod 206 is preferably secured to tubular member 110 by welding.

The relief provided in pushbutton 114 as illustrated in FIG. 35 permits pushbutton 114 to travel axially within tubular member 110, under the influence of axial force applied to exterior surface 162 with pushbutton 114 moving to the left in FIG. 35 past transverse rod 206. A longitudinally elongated slot 210 is provided in the bottom of tubular member 110 as illustrated in FIG. 34. Pushbutton 114 can traverse substantially the longitudinal length of slot 210 under the influence of axial force applied to exterior surface 162 against force applied by spring 112.

As used in this patent application the "axial" force denotes force such as can be applied in a single direction by pushing with the palm of the hand. One of the major advantages of the power wheelchair in the preferred embodiments of the invention is that the seat may be removed from the frame and reengaged with the frame solely by application of such axial force such as; may be applied using the palm of the hand. This is significant in that use of the thumb is not required. This is extremely helpful for elderly, infirmed and handicapped persons such as those who through the effects of arthritis or other diseases or injury have lost use of or strength in the thumb and/or other fingers. Hence the axial force applied using the palm is applied in a single direction as by pushing with the palm.

Axially extending tubular members 110 further include rear transverse rods 212 which are resident within rear arcuate cut-outs similar to forward arcuate cut-outs 208 illustrated in FIGS. 34 and 35 but which have not been numbered in the drawings. Rear transverse rods 212 are secured to longitudinally extending tubular members 110 similarly to forward transverse rods 206, preferably by welding. At the position on longitudinally extending tubular members 110 at which rear transverse rods are connected thereto, there is no slot analogous to axial slot 210 illustrated in FIGS. 34 and 35 nor is there any spring or pushbutton structure analogous to that illustrated as pushbutton 114, spring 112 and exterior surface 162 in FIGS. 34 and 35.

Rear seat support members 98 are similar to forward seat support members 96 in that rear seat support members 98 also include a U-shaped frame portion somewhat similar to that of U-shaped frame portion 150 of forward seat support members 96. The U-shaped frame portion of a rear seat support member 98 is illustrated in elevation in FIGS. 25 through 28. Rear seat support members 98 include a pair of spaced-apart vertically upstanding walls, one of which is visible in the view presented by FIGS. 25 through 28 and is designated 214 in the drawings.

Walls 214 are separated transversely sufficiently to receive longitudinally extending tubular member 110 therebetween as generally illustrated in FIGS. 25 through 28. Walls 214 each preferably include parallel, transversely aligned forwardly opening longitudinally elongated slots formed therein. These slots are clearly shown in FIG. 28. The slots in walls 214 of rear seat support members 98 are adapted to receive rear transverse rods 212 which are affixed to a lower portion of longitudinally extending tubular member 110 closer to the rear terminus thereof than to the forward terminus, all as illustrated in FIG. 28. Hence, rear transverse rods 212 may be easily slid into the slots in walls 214 of rear seat support members 98.

Rear seat support members 98 and specifically walls 214 thereof are mounted on shafts 154 which, as described above, are preferably cylindrical in configuration to preferably slidably reside in holes drilled in the upper and lower portions of tubular members 62. Rear seat support members 98 are retained in position respecting tubular members 62 using pins 158 received in a selected one of semi-circular bottomed grooves 156 formed in shaft portions 154, as discussed above and as shown in the drawings respecting the forward seat support members 96.

The semi-circular bottomed grooves 156 formed in shaft 154 of the rear seat support member are formed facing the rear of the power wheelchair; this is in order to provide assurance that the power wheelchair in general and the seat mounting system in particular is properly assembled. Specifically, note that if rear seat support member 98 is inserted into longitudinally extending tubular frame member 62 backwards, with axial slot 210 facing towards the rear, rear seat support member 98 cannot be secured in place because pin 158 will not be able to engage a semi-circular bottomed groove 156 but rather will interfere with a solid portion of the shaft 154 of rear seat support member 98. As yet another advantage resulting from the orientation of the semi-circular bottomed grooves 156 formed in shaft 154 of the rear seat support member, seat support members 96, 98 are preferably plastic composite materials, most preferably glass filled nylon. These materials are stronger in compression than in tension. Positioning the forward and rear seat support members 96, 98 in the manner illustrated with the grooves facing oppositely in the forward and rear seat support members takes advantage of the higher strength in compression characteristic of the glass filled nylon thereby to provide maximum strength regions in the respective seat support members to resist stresses received when wheelchair 10 is rapidly decelerated or accelerated while proceeding either forwards or backwards.

In order to secure seat 14 in position on frame 12, initially an individual lifts seat 12 first to position circularly cross-sectioned longitudinally extending tubular members 110 of subframe 108 between the upstanding walls of rear seat support member 98 and then to position rear transverse rods 212 within forwardly opening longitudinally elongated axial slots 210 as indicated generally by arrow N in FIG. 28. This sequence of operation facilitates securing seat 14 in position on frame 12. Specifically, by initially positioning circularly cross-sectioned longitudinally extending tubular members 110 of subframe 108 between the respective walls of rear seat support members 98, this helps to align rear transverse rods 212 and a position to easily engage forwardly opening longitudinally elongated axial slots 210, all as indicated by arrow N in FIG. 28. Once rear transverse rods 212 have engaged axial slots 210, rearward force is applied to seat 14, specifically to cushion 20, to slide rear transverse rods into flush engagement with the closed ends or bottoms of the horizontal slots formed in walls 214 of rear seat support members 98.

Once rods 212 are in this position within slots 210, seat 14 may be pivoted downwardly about an axis defined by rear transverse rods 212 in the direction indicated by arrow P in FIG. 26.

As seat 14 pivots downwardly about the axis defined by rear transverse rods 212, rods 206 encounter a rounded, downwardly sloped upwardly facing surface 216 of hooking member 100. Surface 216 is so-designated and illustrated in FIGS. 31, 32 and 33. As forward transverse rod 206 bears downwardly on Surface 216, the rounded configuration of rod 206 and the rounded downwardly sloping configuration of surface 216 resolves the force applied by rod 206 due to the weight of seat 14 to produce a force vector on hooking member 100 tending to rotate hooking member 100 in the direction illustrated by arrow A in FIG. 31.

As hooking member rotates in the direction indicated by Arrow A in FIG. 31 tip 152 of hooking member 100 rotates into the position illustrated in phantom lines in FIG. 31 thereby opening the mouth of the groove indicated by arrow J in FIG. 31. This permits forward transverse rod 206 to move downwardly into a position at which forward transverse rod 206 is supported by a horizontal shoulder portion 218 of U-shaped frame 150 of forward seat member 96. This movement in an arcuate direction is indicated by arrow P in FIG. 26. Horizontal shoulder surface 218 is illustrated in so-designated in FIGS. 31 and 32. Seat 14 in position with forward transverse rods 206 restoring on horizontal shoulder surfaces 218 and engaged with forward seat support members 96 is illustrated in FIG. 27.

Once forward transverse rods 206 are resident on horizontal shoulder surfaces 218 and are abutting shoulder surfaces 220 of forward seat and once forward transverse rod 206 has cleared tip 152 of hooking member 100, the bias applied to hooking member 100 by spring 102 causes hooking member 100 to rotate clockwise in FIGS. 25 through 33 thereby causing open slot 106 to close over forward transverse rod 206. In this position for-ward rod 206 is restrained against forward movement by hooking member 100 and against rearward movement by forwardly facing vertical shoulder surfaces 220. Additionally, rear transverse rod 212 is constrained against rearward movement by the closed bottom of the unnumbered horizontal slot in rear seat support member 98. As a result, seat 14 is securely retained by vertical seat support members 96, 98 to frame 12.

As seat 14 pivots about rear transverse rod 212 and moves downwardly as indicated by arrow B in FIG. 26, hooking members 110 are received within slots 210 formed in the bottoms of longitudinally extending tubular members 110. The upwardly extending walls 151 of U-shaped frame portion 150 of forward seat support member 96 are, similar to walls 214 of rear seat support member 98, transversely spaced one from another sufficiently to receive longitudinally extending tubular member 110 therebetween, as depicted generally in FIG. 29. Receipt of longitudinally extending tubular members 110 between upwardly extending walls of the rear seat support member assist in alignment of the seat with the seat support members when the seat is being engaged with the seat support members, as described above.

To remove seat 14 from wheelchair 10, the procedure is reversed. An individual begins by pressing exterior end surfaces 166 to the left in the direction indicated by double ended arrow M in FIGS. 34 and 35. This axially applied manual force moves plugs 114 to the left in FIGS. 34 and 35, against the restraining force constantly applied by spring 112. As plugs 114 move to the left, those plugs encounter rounded downwardly sloping surfaces 216 of hooking members 100. Continued application of manual force to pushbutton surfaces 166 against force applied by spring 112 causes plugs 114 to push against hooking members 100, causing hooking members 100 to rotate counter-clockwise as viewed in FIG. 29, thereby causing tips 152 to rotate upwardly and thereby causing open slot 106 to assume a position where it is opening slightly upwardly, as illustrated in phantom lines in FIG. 31.

At this position the forward ends of longitudinally extendingly tubular members 110 may be lifted. since forward transverse rods 206 are no longer restrained against vertically upward movement by hooking members 100. Hence seat: 14 may be moved upwardly in a pivotal fashion about a pivot defined by rear transverse rods 212, with seat 14 moving in a direction opposite that indicated by arrow P in FIG. 26. Once seat 14 has been rotated somewhat in a direction opposite to that by arrow P in FIG. 26, seat 14 may be moved horizontally, to the right viewing FIG. 26, thereby disengaging rear transverse rods 212 from the horizontal forwardly facing open slots 210 formed in walls 214 of rear seat support members 98.

As illustrated in FIG. 16 power wheelchair 10 includes two motors for driving respective drive wheels 16. These motors are designated generally 76 and are each within a rigid housing which houses, in addition to a motor 76, a transmission 78 for transferring driving rotation from an output shaft of motor 76 to an associated drive wheel 16. The drive wheel/motor transmission combination housing is independently suspended respecting frame 12. Hence each drive wheel 16 is free to move with respect to frame 12 upon encountering an obstacle without the remaining drive wheel 16 moving respecting frame 12. There is no common single axle for drive wheels 16 in the preferred embodiment of the invention.

To facilitate independent suspension of each drive wheel/motor/transmission combination respecting frame 12, frame 12 further includes eye portions 82 which are preferably fixedly connected, preferably by welding, to forward vertical members 66 of frame 12 as illustrated in FIG. 19. Eye portions 82 have apertures 84 formed therein.

Motor 76 and transmission 78 are available from Rockwell Automation in Eden Prairie, Minnesota. Transmission 78 is a right angle worm drive serving to change the axis about which the driving rotation is provided by motor 76. Specifically, motor 76 is positioned so that the motor output shaft extends longitudinally. Associated transmission 78 through the right angle worm drive provides the driving rotation output via axles, not numbered in the drawings, on which connecting to drive wheel 16.

Each motor 76 drives an associated drive wheel 16 via an associated transmission 78. A shift lever 79 extending out of transmission 78 may be rotated to disengage transmission 78 thereby providing free wheel operation of drive wheels 16. When body 34 is in place on frame 12, shift levers 79 protrude through apertures in body 34 thereby permitting facile switchover from driven to freewheeling operation of drive wheels 16 by the wheelchair operator merely twisting shift lever 79.

Figure 21:
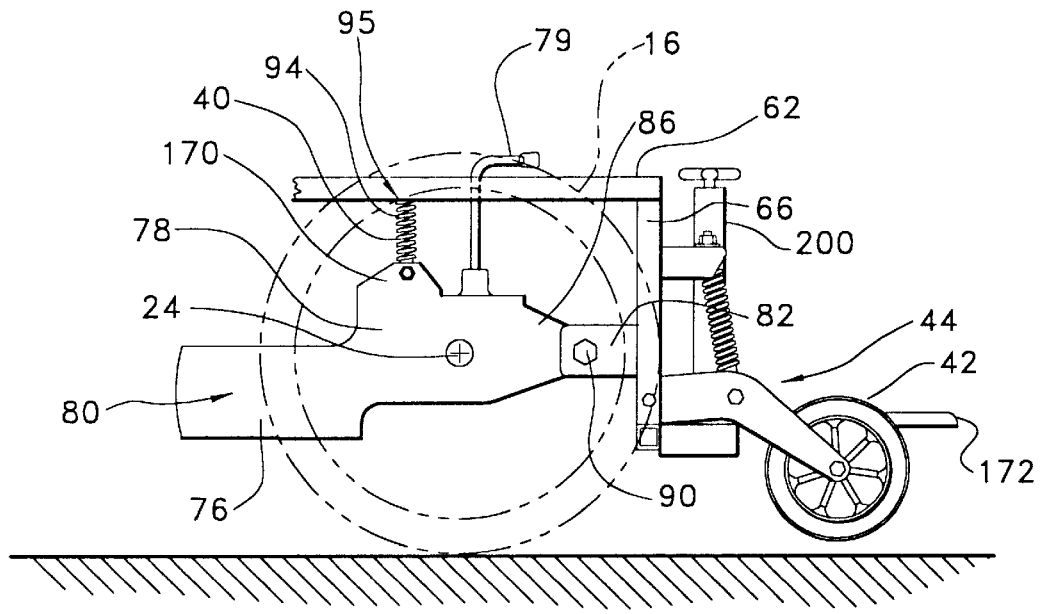
FIG. 21 is a broken side view of the power wheelchair independent drive wheel suspension taken at arrows 21—21 in FIG. 16 with the drive wheel illustrated in phantom.

Motor 76 and transmission 78 are rigidly connected by motor/transmission housing 80. Motor and transmission housing 80 is preferably glass filled nylon, which is extremely strong, provides extremely quite operation and includes an ear portion 86 extending forwardly therefrom as illustrated in FIG. 21. Ear portions 86 include apertures sized and positioned to be congruent with apertures, as illustrated in FIG. 19, so that apertures may be aligned. A pivot pin 90 fits within aligned apertures 84, 88 and permits rotation of housing 80, and hence motor 76 and transmission 78 housed therewithin, relative to frame 12 upon an associated drive wheel 16 encountering an obstacle. Once a drive wheel 16 encounters an obstacle and moves upwardly as indicated by arrow C in FIG. 22, housing 80, having motor 76 and transmission 78 therewithin, rotates upwardly, about a pivot defined by pin 90, relative to frame 14. Bearings are provided at pin 90 to provide for free rotation of motor/transmission housing 80 relative to frame 12 about pin 90.

Further forming a part of the drive wheel independent suspension apparatus is a shaft-spring combination, which combination has been designated 95 in the drawings and is best illustrated in FIGS. 21 through 25. Shaft 92 is pivotally affixed to a web 170 formed integrally as a part of housing 80. Most preferably two parallel webs 170 are provided which are longitudinally commonly position and transversely aligned such that only a single web 170 is illustrated in FIGS. 21 through 25; the second, remaining web is immediately behind the visible web 170 and is spaced therefrom. Further desirably the pivotal connection of shaft 92 to web 170 is provided by means of a shaft, not numbered but illustrated in FIG. 21, which extends between web 170 and the web which is hidden from view and is pivotally mounted in both of these webs for free rotatable motion respecting each of these webs. Shaft 92 is preferably secured to a fitting which fits rotatably on the shaft extending between web 170 and the unnumbered web hidden from view. Shaft 92 extends upwardly from connection with web 170 through an aperture, not shown in FIG. 21, formed in the lower surface of upper longitudinally extending member 62 of frame 14. A coil spring 94 is wrapped around shaft 92 and at one end preferably abuts web 170 or is fixedly connected to the shaft or a sleeve about the shaft which extends between web 170 and the web which is hidden from view in FIG. 21. Spring 94 at its remaining end abuts, but is not fixed to, the lower surface of longitudinally extending member 62.

Figure 22:
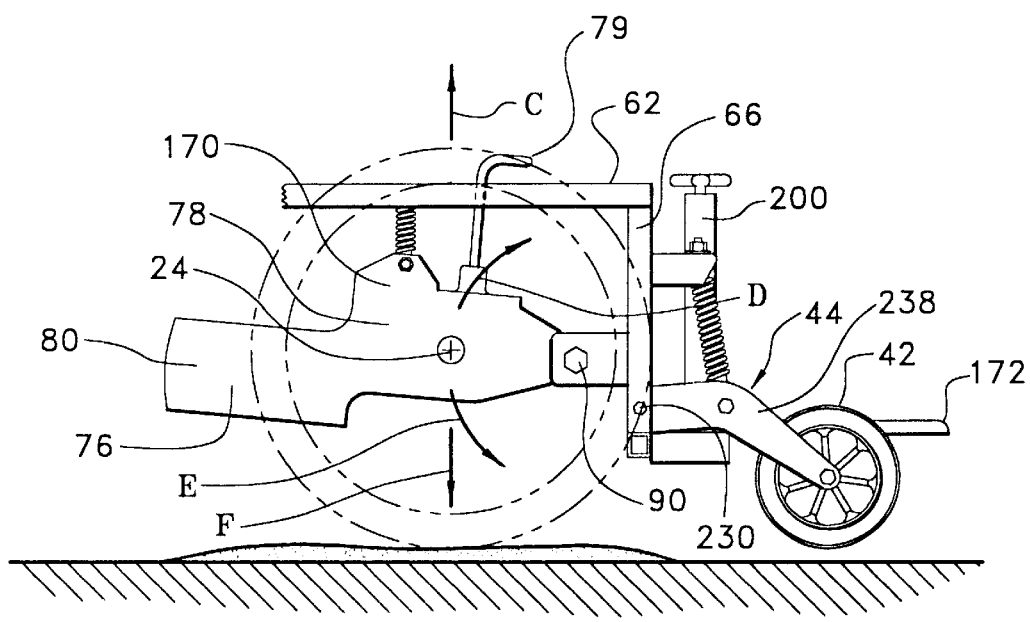
FIG. 22 is a broken side view of the power wheelchair independent drive wheel suspension taken at arrows 21—21 in FIG. 16 with the drive wheel illustrated in phantom, illustrating operation of the drive wheel independent suspension upon the drive wheel encountering an obstacle.
Figure 23:
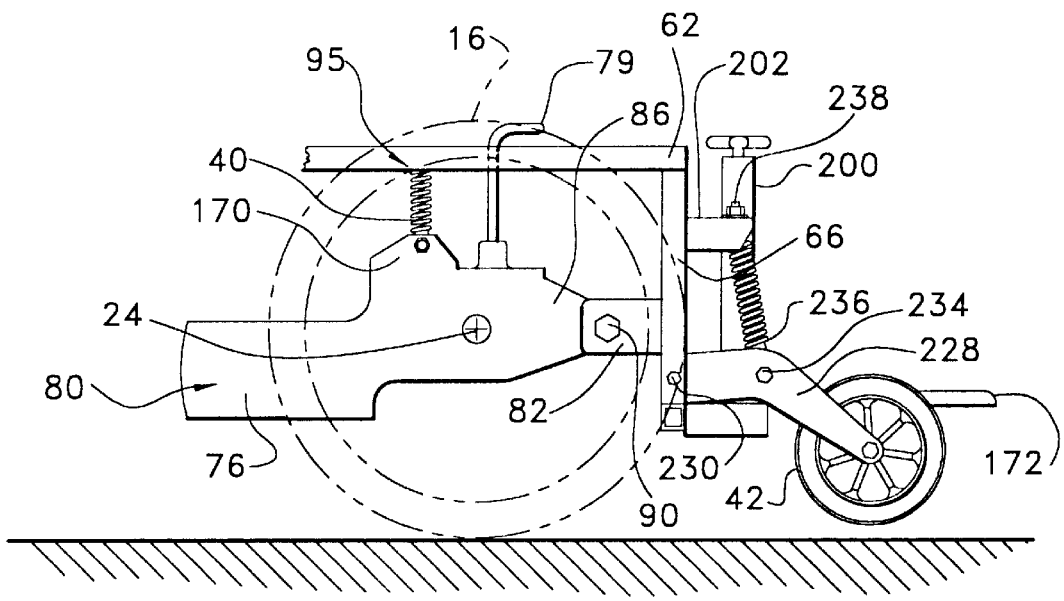
FIG. 23 is identical to FIG. 21 and is presented for purposes of ready reference when considering FIG. 24.

Hence, when an associated drive wheel 16 encounters an obstacle as illustrated in FIG. 22 and moves upwardly as indicated by arrow C in FIG. 22, housing 80 pivots about pin 90, moving in a clockwise direction as indicated by arrow D in FIG. 22 as described above. This upward pivotal movement of housing 80 compresses spring 94 as web 170 moves upwardly thereby reducing distance from web 170 to the lower surface of longitudinally extending member 62. Spring 94, being compressed, exerts downward force on web 170 and hence on housing 80. This force urges housing 80 to rotate counter-clockwise respecting pivot pin 90 as indicated by arrow E in FIG. 22 when drive wheel 16 has passed over the obstacle and moves downwardly as indicated by arrow F in FIG. 22.

Shaft 92 is slidably retained within a fitting in the bottom wall of longitudinally extending tubular member 62. A nut threadedly engages shaft 92 on the upper side of the bottom wall of longitudinally extending tubular member 62. Sliding passage of shaft 92 through the bottom wall of longitudinally extending tubular member 62 permits shaft 92 to rise vertically in response to an associated drive wheel encountering an obstacle such as illustrated in FIG. 22. A clearance aperture 176 FIG. 19) cut in the upper wall of longitudinally extending member 62, immediately above the position of residence of the nut retaining shaft 92, permits upward movement of shaft 92 upon the associated drive wheel encountering an obstacle without shaft 92 interfering with. frame 12 and particularly with longitudinally extending member 62. The downwardly facing surface of the lower wall of longitudinally extending member 62 contacts the upper end of spring 94, thereby precluding upward movement of spring 94 and causing spring 94 to compress upon upward movement of web 170.

In the preferred embodiment as illustrated in the drawings power wheelchair 10 further preferably includes a body 34 which not only provides a decorative, aesthetically pleasing appearance for power wheelchair 10 but also protects the wheelchair user from batteries 32 and the electrical connections between batteries 32 and motor 76. Body 34 further provides protection for batteries 32 and, to some extent motors 76, from spills of liquids, bodily fluids and the like.

Body 34 preferably includes a central generally planar portion which, when body 34 is in place on frame 12, overlies batteries 32. This central planar portion is designated 172 and is visible in FIGS. 17 and 18 and, to a lesser extent, in FIGS. 1, 4, 7, 8, 9, 11 and 13.

As illustrated in FIGS. 1 through 4, 7 through 11, 13, 17 and 18, body 34 preferably further includes fender portions 126 which preferably substantially wrap around upper semi-circular portions of respective drive wheels 16. Fenders. 126 preferably extend outwardly over at least major portions of the width of the associated drive wheels 16, to fit closely about the drive wheel portions which are enveloped by respective fenders 126.

Figure 3:
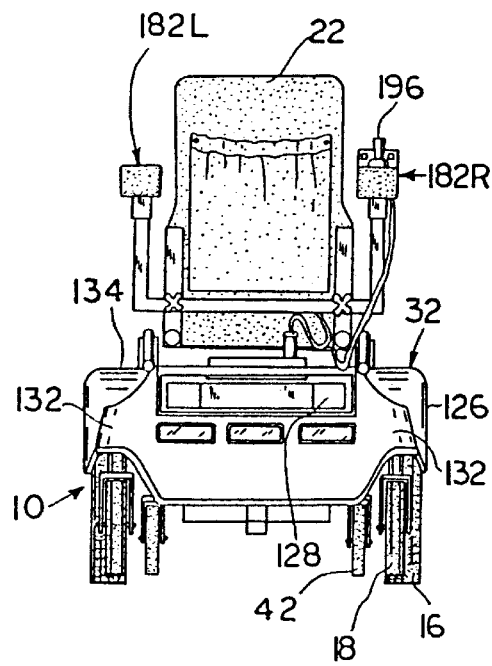
FIG. 3 is a rear elevation of the power wheelchair shown in FIGS. 1 and 2, manifesting aspects of the invention.
Figure 4:
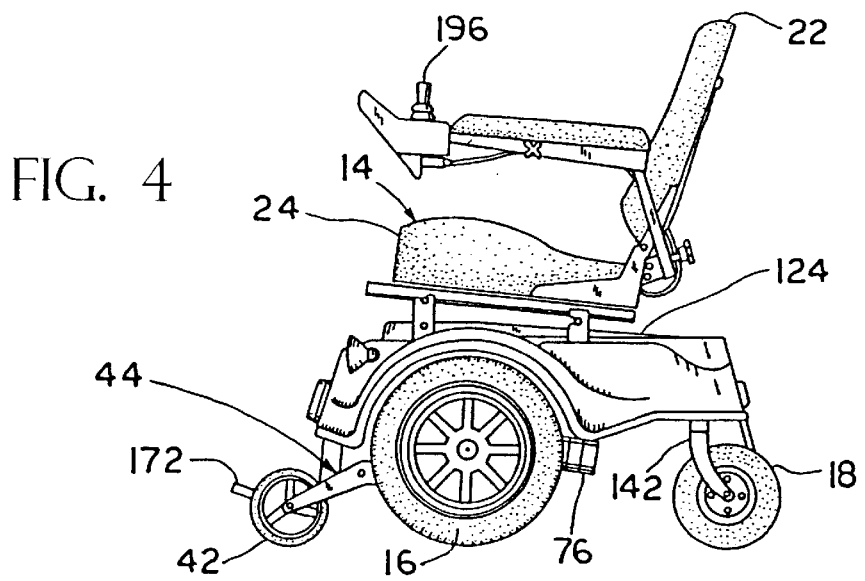
FIG. 4 is a left side view of the power wheelchair shown in FIGS. 1 through 3, manifesting aspects of the invention.
Figure 5:
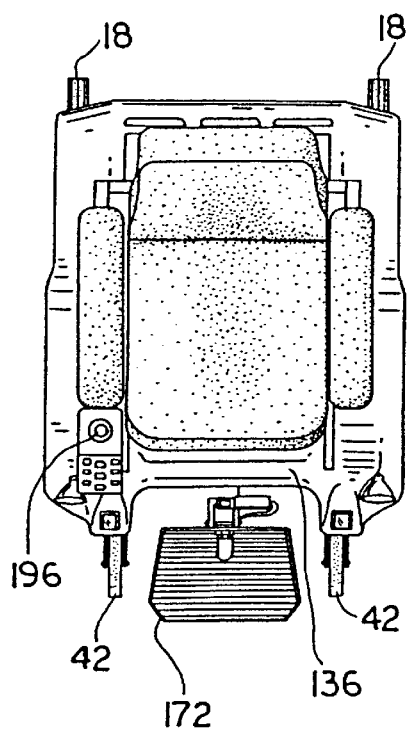
FIG. 5 is an top view of the power wheelchair shown in FIGS. 1 through 4, manifesting aspects of the invention.
Figure 6:
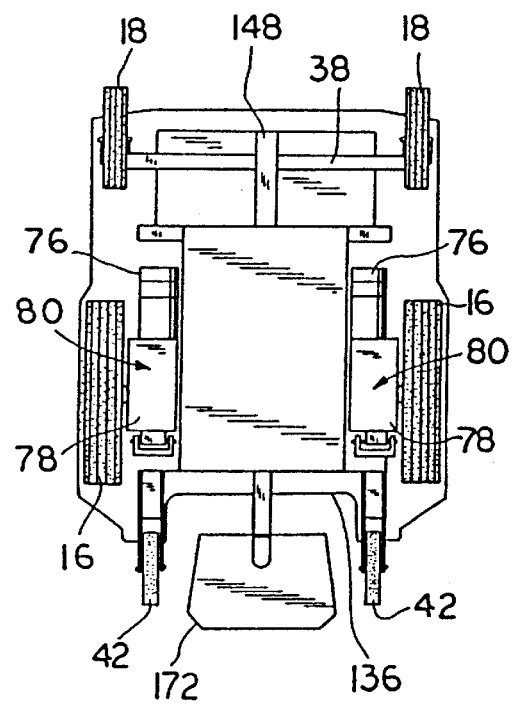
FIG. 6 is a bottom view of the power wheelchair shown in FIGS. 1 through 5, manifesting aspects of the invention.
Figure 10:
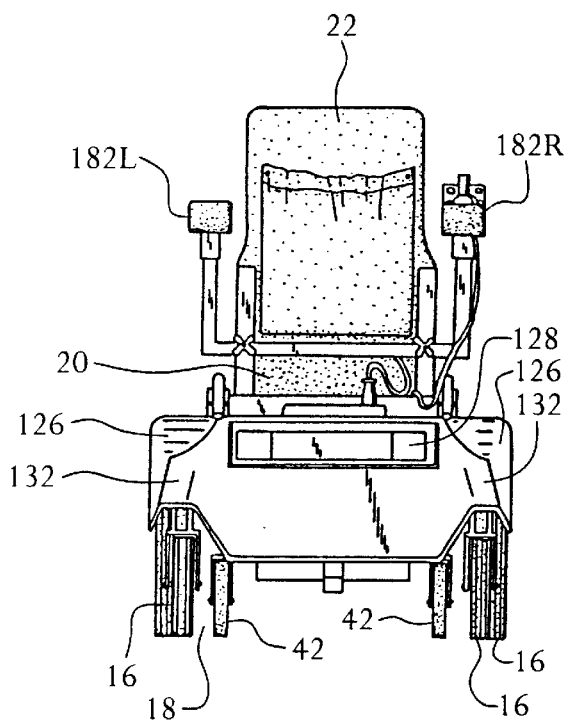
FIG. 10 is a rear view of a power wheelchair shown in FIGS. 7 and 8, manifesting aspects of the invention.
Figure 11:
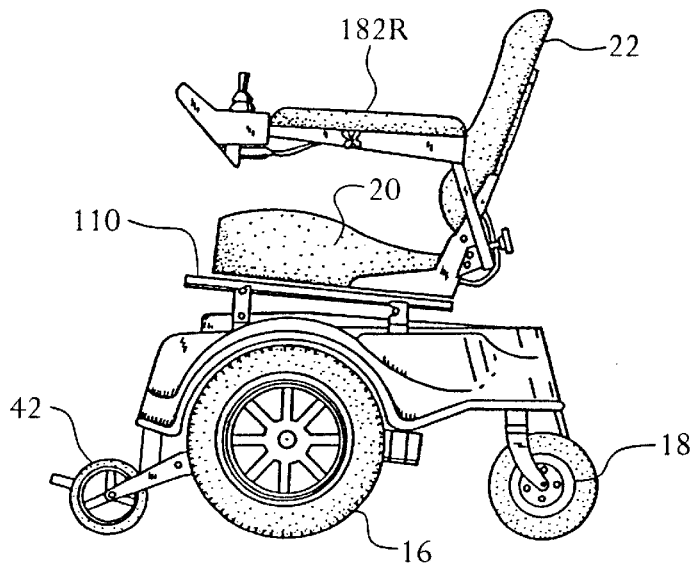
FIG. 11 is a left side view of a power wheelchair shown in FIGS. 8 through 10, manifesting aspects of the invention.
Figure 12:
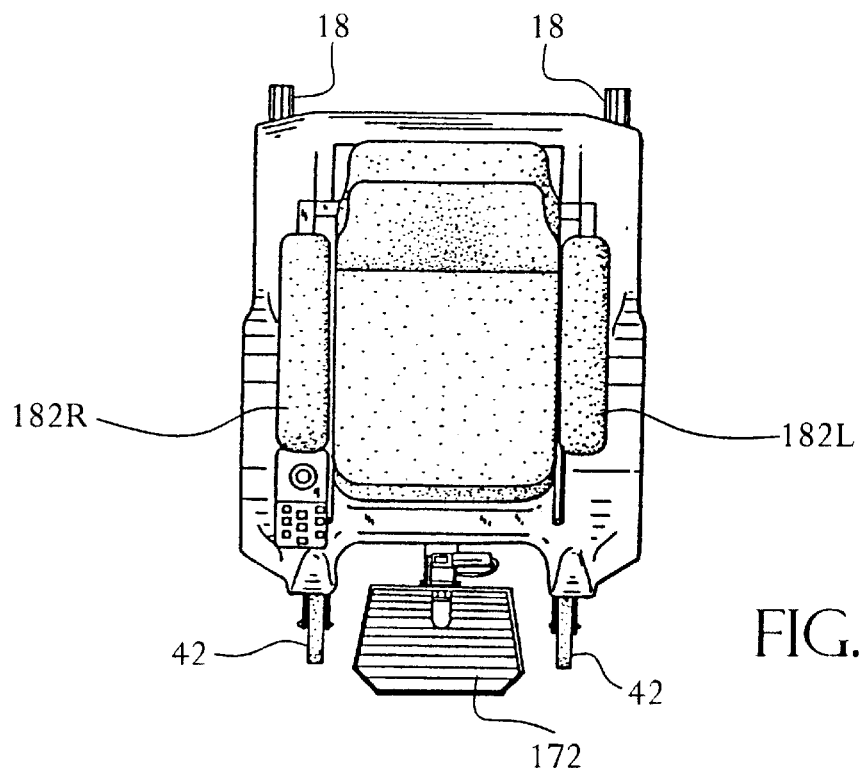
FIG. 12 is a top view of a power wheelchair shown in FIGS. 8 through 11 and manifesting aspects of the invention.
Figure 13:
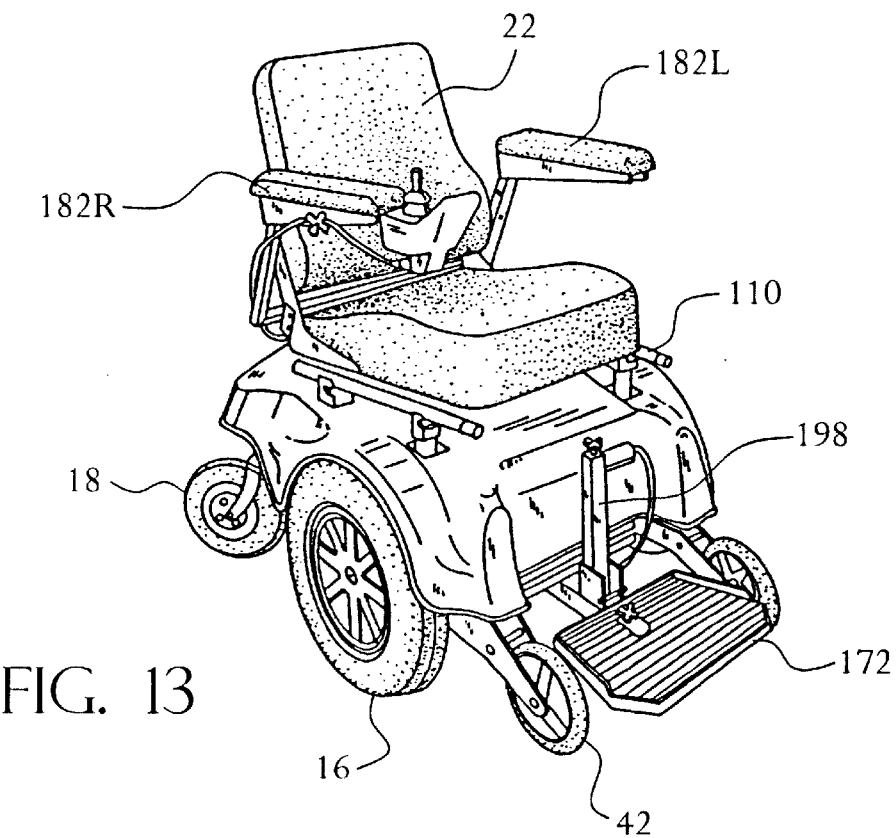
FIG. 13 is a perspective view looking at the right front of the power wheelchair shown in FIGS. 8 through 12, manifesting aspects of the invention.

Body 34 may further include a rearwardly facing openable bonnet portion designated generally 128 in the drawings and best seen in FIGS. 3 and 10. There may be further provided as a portion of body 34 a planar portion 130 extending downwardly from openable bonnet 128 for preferably at least substantially concealing the rear suspension of wheelchair 10, especially transverse beam 38 from which rear idler wheels 18 are suspended.

As illustrated in FIGS. 1, 3, 4, 7, 8, 10, 11, 13, 17 and 18 body 34 preferably further has rear corner portions 132 which are preferably rounded and also extend over the suspension gear for rear idler wheels 18, specifically transverse beam 38 and U-shaped spindles 142. Rounded rear corners 132 and fender portions 126 preferably transition to central planar portion 1 L 24 via at least partially concave transition portions 134 which have apertures formed therein for passage therethrough of upstanding front and rear seat support members 96, 98 and which may have additional apertures therein for passage therethrough of shift levers 79.

As illustrated in FIGS. 1, 2, 4, 5, 7 through 9 and 11 through 13, body 34 preferably yet further includes and has formed therein a pair of forwardly facing integral bumper members 138 lying over and protecting the spring-strut-beam combinations designated generally 44 which govern arcuate upward movement of forward anti-tip wheels 42 relative to frame 12. Body 34 preferably further includes a planar portion extending between forward bumper members 138 where such planar portion is designated 136 and provides a kick panel for the power wheelchair occupant. The kick panel is designated 136 and is illustrated in FIGS. 2, 5, 6 and 9 of the drawings.

Body 34 preferably rests directly on frame 12. Body 34 is preferably a single molded piece of high impact plastic and is exceedingly light. Hence, body 34 may be manually directly lifted off of frame 12 once seat 14 has been removed, without use of tools. Because body 34 fits closely about frame 12 and is effectively contoured to the shape of frame 12 and the associated members by which the rear idler wheels, the forward anti-tip wheels and the other structure are connected to frame 12, body 34 need not be fixed in any way to frame 12. In the preferred embodiment of the invention the power wheelchair operates exceedingly well with body 34 resting on but not secured to frame 12.

If desired body 34 may also be lightly retained in place on frame 12 by mating pads of respective hook and eye material, such as that sold under the trademark Velcro, affixed to upwardly facing surfaces of longitudinally extending tubular member 62, preferably at the forward extremities thereof. Corresponding mating pieces of Velcro are affixed to the under surface of body 34 at planar portions thereof which rest directly on the forward extremities of longitudinally extending tubular members 62. Use of the hook and eye material attachments reducing and indeed effectively eliminates any rattles which might otherwise occur as body 34 which moves slightly relatively to frame 12 during operation of power wheelchair 10.

Figure 20:
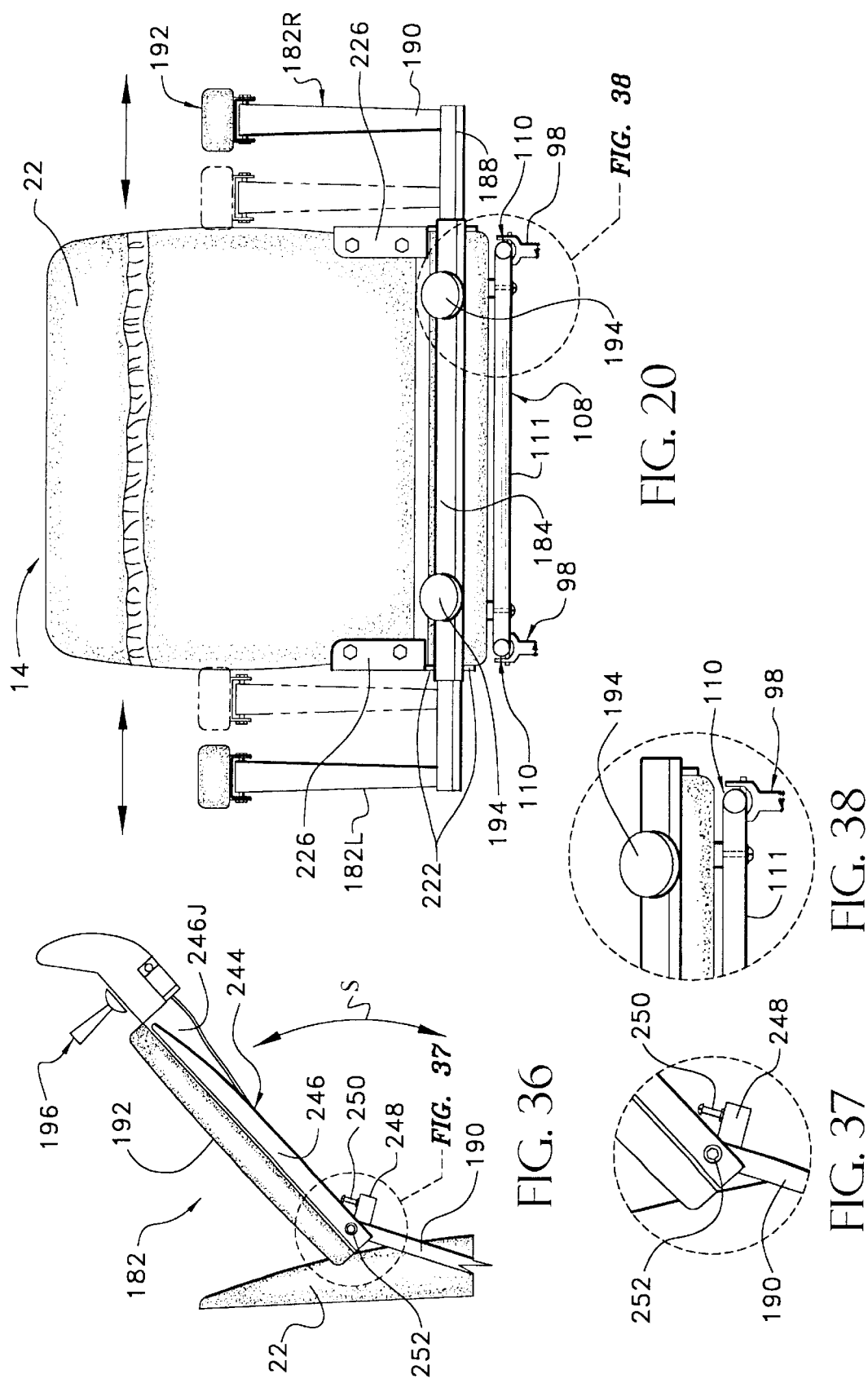
FIG. 20 is a view of the wheelchair seat back looking in the same direction as FIG. 15, illustrating wheelchair seat arm width adjustment aspects of the invention.

FIG. 20 illustrates structure providing means for adjusting transversely with respect to positioning arms of seat 14 where the arms are designated generally 182 with the left (looking forward) arm designated 182 L and the right (looking forward) arm designated 182R. The structure facilitating adjustable transverse separation and positioning of arms 182 L, 182 R includes an arm support base 184 which is preferably a hollow rectangular cross-section tubular member. Arm support base 184 is connected to seat 14, specifically to cushion portion 20 thereof, indirectly. Specifically, arm support base 184 is connected to rearwardly facing portions of L-shaped brackets 222, the lateral portion of one of which is visible in FIGS. 25 and 28 and is partially visible in FIG. 20. The portion of L-shaped bracket 222 which faces rearwardly and is preferably in facing contact with a rearwardly facing surface of cushion portion 20 of seat 14 is not visible in FIG. 20; it is hidden behind the hollow rectangular cross-section tubular member defining arm support base 184. Lateral portions of L-shaped brackets 222 are connected, preferably by welding, to cushion support brackets 224 which are secured to cushion portion 20 of seat 14 and are illustrated in FIGS. 25 through 29. More preferably L-shaped brackets 222 are secured to lateral flange portions of cushion support brackets 224 via a pair of Phillips head screws illustrated in FIGS. 25 and 28 but not numbered to aid clarity of the drawings.

Cushion support brackets 224 preferably include upstanding portions which run along the longitudinally extending side surfaces of seat cushion 20 and bottom portions which run longitudinally along the bottom surface of seat cushion 20. Cushion support brackets 224 are preferably secured to cushion portion 20 of seat 14 via screw-type fasteners driven into the bottom of seat cushion portion 20 through apertures in the bottom longitudinally extending portions of cushion support brackets 224.

A seat back support bracket 226 illustrated in FIG. 20 and FIGS. 25 and 28 is of generally L-shaped cross-section and includes a rearwardly facing flange portion and a side facing flange portion. The rearwardly facing flange portion includes apertures therethrough for screw-type fasteners to pass through and into the rearwardly facing surface of seat back 22, to secure seat back 22 to the associated seat back support bracket 226.

Seat back support brackets 226 are preferably connected to seat cushion support brackets 224 via a single rivet connection at each side of seat cushion and back portions 20, 22; the single rivet connection is somewhat visible in FIGS. 25 and 28. The single rivet connection is partially hidden by a portion of the arm support structure, specifically a vertically extending arm support member 190 in FIGS. 25 and 28. The single rivet connection between seat back support brackets 226 and seat cushion support brackets 224 facilitates folding or pivoting movement of seat back 22 towards seat cushion 20 about the points of single rivet connection between cushion support brackets 224 and seat back support brackets 226.

Arm support extensions are designated generally 186 in FIG. 20 and include horizontal supports 188 and vertically extending supports 190. Arm cushions 192 are pivotally connected to vertical supports 190 for arcuate motion of arm cushions 192 with respect thereto.

Arm support base 184 includes a pair of tapped holes, not illustrated in FIG. 20, which receive in complemental threaded engagement threaded shaft portions which are fixed to hand knobs 194, illustrated in FIG. 20. The threaded shafts affixed to knobs 194, when advanced or retracted by rotation of knobs 194 through complemental engagement of the threaded shafts with the tapped holes in arm support base 184, move against or retract from contact with respective horizontal arm support portions 188 of arm support extensions designated generally 186, which are associated with left and right arms 182 L, 182 R.

Frictional contact between the threaded shafts fixedly connected to knobs 194 and respective horizontal arm support portions 188 fixes arm support extensions 186 in position when the threaded shafts are tightly turned there against. Fixation of arm support extensions 186 in position fixes the position of arms 182L, 182R. Since horizontal arm supports portions 188 are movable into and out of arm support base 184, arms 182L, 182R and arm cushions 192 may be manually moved between the positions illustrated in solid lines in FIG. 20 and the positions illustrated in dotted lines in FIG. 20, thereby adjusting effective width of seat 14 of power wheelchair 10.

Knobs 194 are rotated by application of manual force thereto. Once the knobs are rotated to a position at which threaded shafts associated therewith only lightly contact or do not even contact horizontal arm support portions 188, these horizontal arm support portions may be moved by hand, thereby adjusting transverse separation of arm cushions 192 and hence the effective width of seat 14, all without use of tools.

Forward anti-tip idler wheels 42 do not normally contact the ground or other surface on which wheelchair 10 operates. Anti-tip wheels 42 are maintained above the ground and provide protection against tipping in the event of forward pitching of wheelchair 10 due to encounter with an obstacle, traverse of a significant downgrade and the like. The off-the-ground, anti-tip positioning of idler wheels 42 is illustrated in FIG. 14.

Anti-tip idler wheels 42 are connected to frame 12 via a spring-strut-beam combination which is designated generally 44 in the drawings, specifically in FIGS. 14 and 21 through 24. Each spring-strut-beam combination 44 includes a U-shaped spindle 228; one leg (of the U-shape) of one of spindles 228 is shown in side view in FIG. 14. The U-shape of spindles 228 is readily apparent from FIG. 16.

U-shaped spindles 228 are preferably fabricated by welding rectangular cross-section tubular stock between two parallel plates with the tubular stock forming the base of the U. Spindles 228 are preferably pivotally connected to frame 12 using screw-bolt assemblies. The side plate portions of spindles 228 fit pivotally on either side about the lower portions of respective downwardly extending vertical tubular members 66, which are illustrated in FIGS. 19 and 21 through 24. The nut and bolt pivotal connections of U-shaped spindles 228 to vertically downwardly extending members 66 are depicted schematically by indicator numeral 230 in FIGS. 21 through 24.

Extending between the legs of U-shaped spindles 228 are shafts 234. Mounted on shafts 234, via passage of shafts 234 through bores formed therein, are cylindrical spring support bases 236, upper most extremities of which are visible in FIGS. 21 through 24. Secured to and extending from cylindrical spring support bases 236 are upstanding shafts 238, the upper extremities of which extend through and are slidably retained within fittings which are resident within apertures, which have not been numbered in the drawings, formed in horizontally extending planar portions of forwardly extending pedestals 202, which are visible in FIG. 19 as well as in FIGS. 21 through 24. One of upstanding shafts 238 has been identified by a lead line extending to the vertical extremity thereof in FIGS. 23 and 24.

Figure 24:
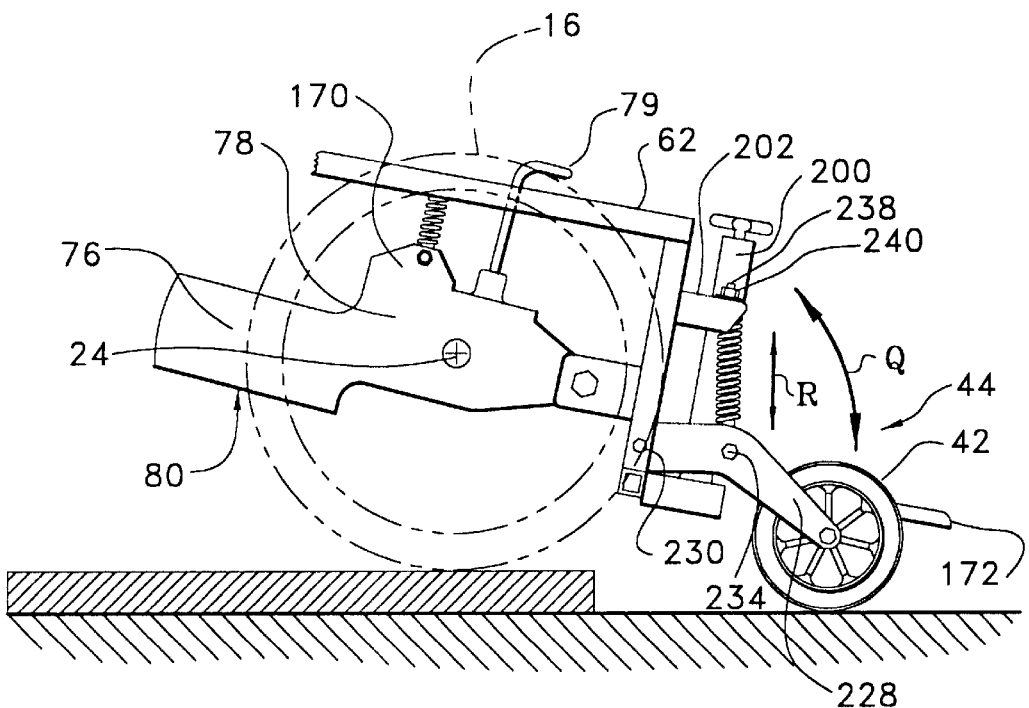
FIG. 24 is a side view of the drive wheel and forward idler anti-tip wheel independent suspension apparatus taken at arrows 24—24 in FIG. 16 and illustrating operation of the anti-tip wheel suspension apparatus aspects of the invention.

With this arrangement, upon an anti-tip wheel 42 encountering an obstacle or upon wheelchair 10 pitching forwardly as depicted schematically in FIG. 24, anti-tip wheels 42 move arcuately, together with U-shaped spindle 228, as they pivot about pivotal connection 230 relative to frame 12. This pivotal motion is denoted by double ended arrow Q in FIG. 24. As the illustrated anti-tip wheel 42 and U-shaped spindle 228 pivot about connection point 230, upward movement of spindle 228 causes distance between shaft 234 and pedestal 202 to decrease, thereby compressing spring 236 in the direction indicated by double ended arrow R in FIG. 24.

Compression of spring 236 provides a cushioning effect when anti-tip wheels 42 contact an obstacle or contact the ground due to forward pitching of power wheelchair 10 as illustrated schematically in FIG. 24. The suspension of anti-tip wheels 42 provided by spring-strut-beam combination 44, where this combination is defined by spring 236 with the "strut" being provided by shaft 234 and the "beam" being provided by spindle 228, connects anti-tip idler wheels 42 to frame 16 for arcuate upward motion relative to frame 12 upon tipping of power wheelchair 10 or contact of anti-tip wheels 42 with an above-grade obstacle.

A nut 240 mounted on the threaded portion of shaft 234 extending above pedestal 202 permits selectable compression of spring 236 thereby providing adjustment of the spring force applied to anti-tip second idler wheels 42 to resist arcuate upward movement thereof upon forward tipping of power wheelchair 10 or upon wheels 42 encountering an obstacle. Rotation of nut 240 also adjusts the distance at which wheels 42 are from the ground.

The tight maneuverability feature of the power wheelchair achieved by locating the drive wheels, which are front wheel drive wheels, close to the longitudinal center of the power wheelchair, while having many attendant advantages as described above, has a minor disadvantage in that there is a slight tendency to tip if a significant obstacle is encountered when the chair is decelerating or traveling forwardly downhill.

The slight tendency towards forward tipping is counteracted by the spring loaded anti-tip wheels 42 located in front of each drive wheel 16. Spring loading of anti-tip wheels 42 is accomplished via springs forming portions of spring-strut-beam combinations 44 biasing anti-tip wheels 42 downwardly towards the ground. When choosing the rate for these springs used in connection with anti-tip wheels 42, compromise is required between a spring rate stiff enough to resist forward tipping upon deceleration of the power wheelchair yet light enough to allow the power wheelchair to overcome minor obstacles such as incline transitions, curves or other uneven terrain.

In the preferred embodiment longitudinal distance between the position of aperture 88 in ear 86 of housing 80, specifically the center of aperture 88, and the drive axle for the associated drive wheel, where the drive axle emerges from housing 80 to drive the associated drive wheel 16, is preferably in the neighborhood of from two and three quarters (2 and ¾) to three (3) inches, measured longitudinally. This pivotal connection of the drive motor/transmission housing 80 to frame 12 via the pivotal connection of ear portion 86 with eye portion 82 provides the active independent suspension system for the combination of motor 76 and transmission 78 in housing 80 and associated. drive wheel 16.

Upon power wheelchair 10 accelerating forwardly, the rear of motor 76 tends to drop and housing 80 tends to pivot downwardly about pivot pin 90 residing in apertures 84, 88 formed in the eye portion 82 of frame 12 and ear portion 86 of housing 80 respectively. Conversely, when the power wheelchair decelerates as the power wheelchair user allows the control joystick to return to the center position, the rear of motor 76 tends to move upwardly as housing 80 tends to rotate about the pivot point defined by pivot pin 90.

The independent suspension of the drive motor/transmission housing 80 with an associated drive wheel 16, provides some interaction with anti-tip wheels 42 and minimizes the range of spring constants which must be considered in the course of the design compromise.

Figure 39:
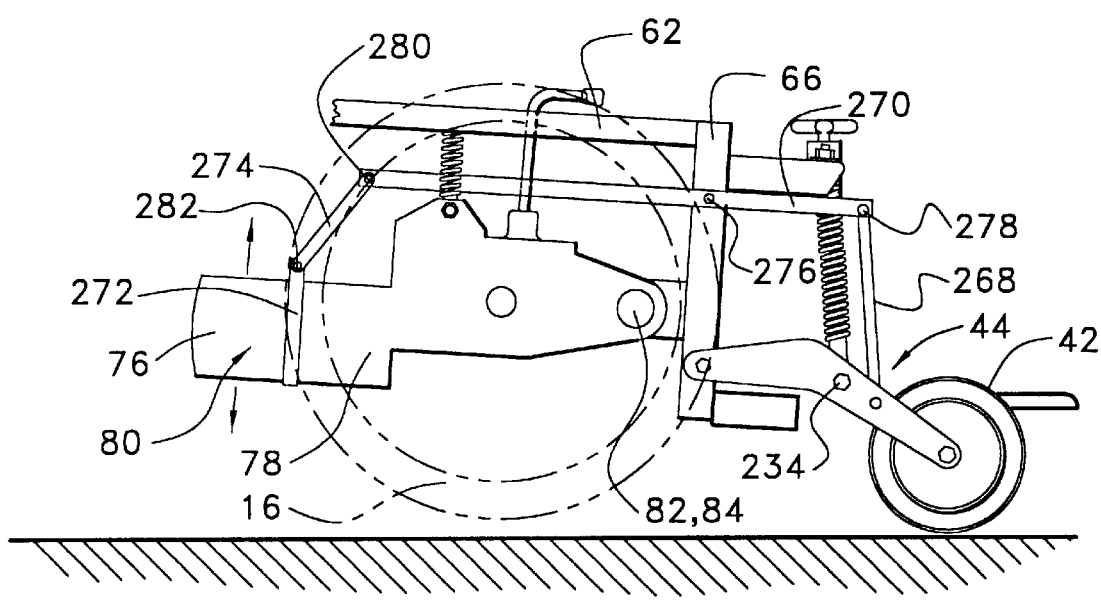
FIG. 39 is a broken side view of an alternate embodiment of suspension apparatus for the power wheelchair drive wheels and forward anti-tip wheels taken at arrows 21—21 in FIG. 16 and with the drive wheel illustrated in phantom, similarly to FIG. 21.

In yet a further aspect of the invention, these movements of motor 76 and especially of the pivotally movement of housing 80 relative to frame 14 may be used to control action of the forward anti-tip wheels 42 in a manner illustrated schematically in FIG. 39.

Where in addition to the structures illustrated in FIGS. 21 through 24 effectuating independent suspension of drive wheel 16 and anti-tip wheels 42 respecting frame 12, there is provided a pivoting beam 270 which is pivotally connected to forward vertically extending member 66 of frame 12 via a pivotal connection denoted 276 in FIG. 39. At a forward end of pivoting beam 270 a vertical strut 268 is pivotally connected thereto at a pivot connection denoted 278. The lower end of vertical strut 268 is pivotally connected to a side wall of spindle 238 via a pivotal connection which has not been numbered in FIG. 39.

The opposite, rearward end of pivoting beam 270, an intermediate link 274 is pivotally connected thereto via a pivotal connection denoted 280 in FIG. 39. At the remaining end of intermediate link 274 there is pivotal connection 282 effectuating pivotal connection of intermediate link 274 and motor link 272, the opposite end of which is preferably fixedly connected to housing 80 of motor 76 and transmission 78. Hence the relative upward and downward movement in an arcuate fashion about the point of pivotal connection of eye and ear 82, 84 between housing 80 and frame 12 as denoted by the drawings in FIG. 39 is effectively used to counter-act undesired movement of anti-tip wheel 42 upon the vehicle encountering an obstacle.

With tilt of seat 14 being adjustable in a manner that cushion portion 20 of seat 14 may be level or positioned tilting forward or tilted back, it is desirable to provide adjustment for arm portions 192 of seat 14 so that arm portions 192 may be adjustably positioned, desirably in a level orientation regardless of whether cushion portion 20 of seat 14 is level, tilted forward or tilted back. Structure facilitating adjustment of the position of arm portion 192 and permitting arm 192 always to be positioned in a level orientation is illustrated in the drawings, particularly in FIG. 36.

Arm 192 includes an arm cushion portion 242 which is preferably upholstered to provide cushioning for the arms of the user of power wheelchair 10. Arm cushion portion 242 is mounted on a longitudinally elongated support web 244. Arm cushion portion 242 and longitudinally elongated arm cushion support web 244 together constitute an arm 182 of power wheelchair 10.

Figure 2:
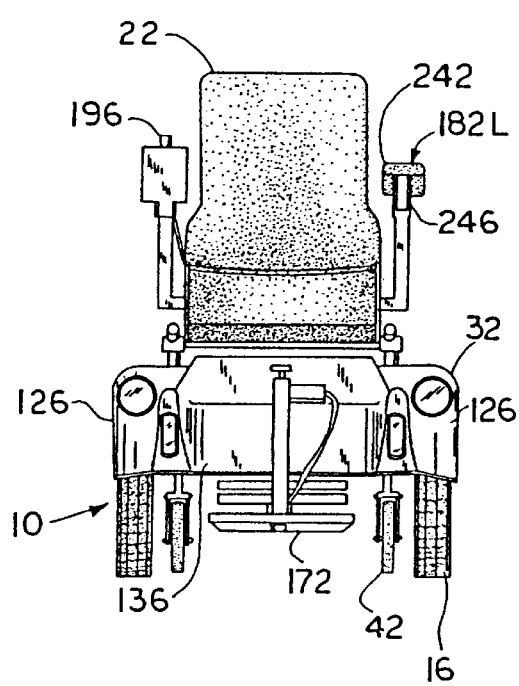
FIG. 2 is a front elevation of the power wheelchair shown in FIG. 1, manifesting aspects of the invention.

Support web 244 has a horizontally oriented central portion on which arm cushion portion 242 is supported and two vertically extending webs, which are visible in FIG. 2. Two webs 246 may be of different size and shape with one of webs 246 supporting joystick controller 196 and the electronics associated therewith and the remaining web 246 being of more tapered, somewhat truncated shape. Web 246 supporting joystick 196 and the associated electronics is denoted 246 J in the drawings.

Affixed to the lower longitudinal extremity, preferably by welding, of vertical support portion 190 of arm support extension 186, is a mounting block 248, as illustrated in FIGS. 36 and 37. Mounting block 248 preferably has a tapped hole therein. Residing within the tapped hole is a bolt threadedly engaging the tapped hole where the bolt is designated 250 in FIGS. 36 and 37. Bolt 250 can be advanced into or withdrawn from the tapped hole in mounting block 248 thereby to vary the length of bolt 250 protruding from mounting block 248.

Arm 192 connects to vertical support portion L 90 via a pivotal connection provided by a single rivet indicated as 252 in FIGS. 36 and 37.

As is apparent from FIG. 36 and especially from FIG. 37, vertical webs 246, 246J of longitudinally elongated arm cushion support web 244 are spaced apart to receive the extremity of arm vertical support portion 190 therebetween. Mounting block 248 is preferably of the same width, measured transversely to the plane of the paper, as vertical arm support portion 190. Hence mounting block 248 and bolt 250 may fit easily slidably between webs 246, 246J of arm 182. When arm 182 is pivoted downwardly about the pivotal connection provided by rivet 252, in the direction indicated by double ended arrow S, the central portion of longitudinally elongated arm cushion support web 244 contacts the head of bolt 250 and cannot move further arcuately downwardly as a result of such contact. Adjustment of the position of bolt 250 specifically by rotating bolt 250 and advancing bolt 250, into or out of mounting block 248, thus adjusts the angle at which arm 182 and specifically the central portion of longitudinally elongated arm cushion support web 244 contacts bolt 250 thereby facilitating adjustment of the angular position of arm 182 relative to the remainder of seat 14 when arm 182 is positioned at the limit of its arcuate downward travel in the direction of ended arrow S in FIG. 36.

Position of footrest 172 is adjustable to accommodate users of the power wheelchair of various heights. Additionally, the angle of footrest 172 is adjustable to provide maximum foot comfort for the user of the power wheelchair.

Footrest 172 is mounted for adjustable vertical movement up and down along upstanding extension member 200 illustrated in FIG. 19. Member 200 preferably has vertically elongated slots formed in its forwardly and rearwardly facing surfaces; only the slot in the forward facing surface of member 200 is illustrated in the drawings.

Figure 17:
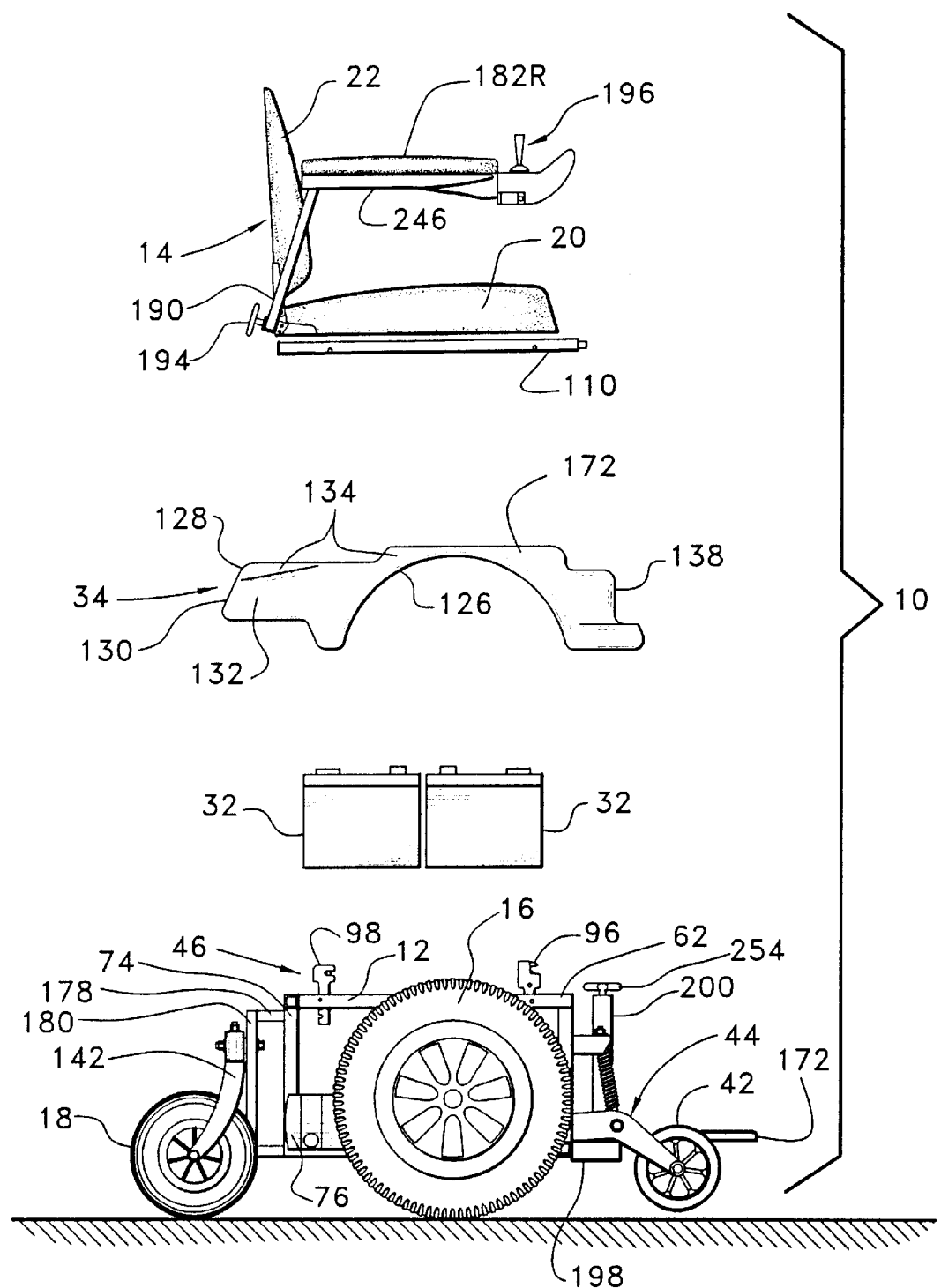
FIG. 17 is an exploded side view of the power wheelchair illustrated in FIGS. 14 through 16 taken in the same direction as FIG. 14 and illustrating the manner in which the power wheelchair batteries, body and seat are assembled with the power wheelchair frame and running gear.
Figure 18:
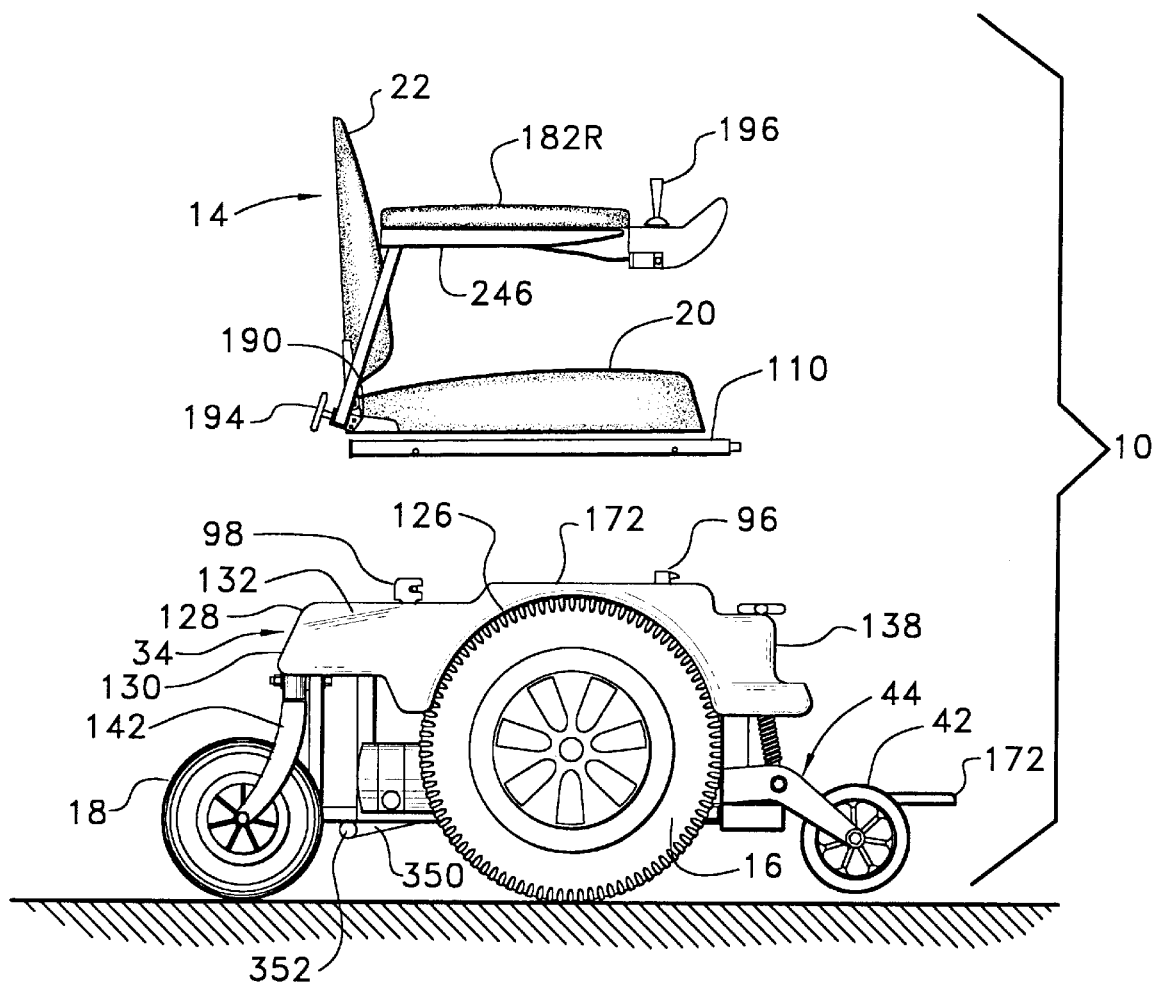
FIG. 18 is a partially exploded side view of the power wheelchair illustrated in FIGS. 14 through 17 taken looking in the same direction as FIG. 17 with the batteries and wheelchair body in position and supported by the wheelchair frame and with the wheelchair seat illustrated removed from the frame and above the frame/body assembly.

Mounted in the opening at the top of upstanding extension member 200 as illustrated in FIGS. 16 and 17 is a knob and threaded shaft combination designated generally 254. The knob and an extreme upper portion of the attached threaded shaft are visible in FIG. 2 as well as in FIG. 14. The threaded shaft portion of combination 254 preferably runs down the length of upstanding extension member 200, in the interior thereof. Knob/threaded shaft combination 254 is retained in place by a bushing which preferably fits flush within the upper opening of upstanding extension member 200, which opening is visible in FIG. 19. The bushing is not shown in the drawings.

Footrest 172 is connected to upstanding extension member 200 by an open, box-like frame 256 which is shown in FIG. 19. Frame 256 fits slidably about upstanding extension member 200 and is in essentially complemental facing contact with the exterior surfaces of upstanding extension member 200 about all four sides thereof. A transversely extending pivot pin provides pivotal connection between footrest 172 and open box-like frame 256 thereby permitting footrest 172 to be tilted upwardly by pivotal motion about the pivot pin respecting open box-like frame 256 and upstanding extension member 200.

A nut, preferably a ball nut, threadedly engages the threaded shaft portion of knob/threaded shaft combination 254 and is resident within vertically upstanding extension member 200. A pair of preferably threaded shafts 262 preferably extend through apertures in the forwardly and rearwardly facing walls of open box-like frame 256 and through the vertically elongated slots in the forward and rearwardly facing surfaces of vertically upstanding member 200 to engage nut within upstanding member 200. This pair of threaded shafts restrain nut from rotating with the threaded shaft portion of combination 254 upon rotation of the knob portion thereof.

With this arrangement rotation of the knob portion of combination 254 causes corresponding rotation of threaded shaft portion of combination 254 since the knob and threaded shaft are fixedly connected. Since nut threadedly engages the threaded shaft portion of combination 254, if nut were not restrained against rotation, nut would rotate with the shaft portion of combination 254. However threaded shafts, restraining nut 260 against rotation, cause nut to rise or fall according to the direction of rotation of the shaft portion of combination 254. This rise and fall of nut carries threaded shafts 262 and hence open box-like frame 256 and footrest 172 therewith, as the knob portion of combination 254 is rotated clockwise or counter-clockwise. Hence, vertical position of footrest 172 can be adjusted along the length of the vertically elongated slots present in vertically upstanding member 200 by manually turning the knob of combination 254; no tools are required for adjusting vertical position of footrest 172.

Angular orientation of footrest 172 relative to vertically upstanding member 200 may also be adjusted.

Figure 7:
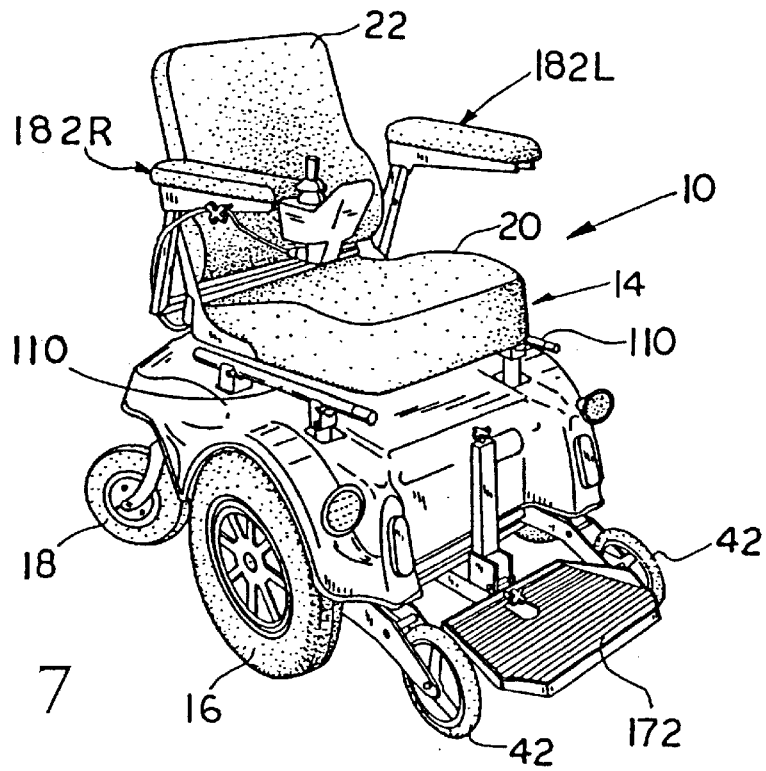
FIG. 7 is a perspective view looking at the right front of the power wheelchair shown in FIGS. 1 through 6, manifesting aspects of the invention.
Figure 8:
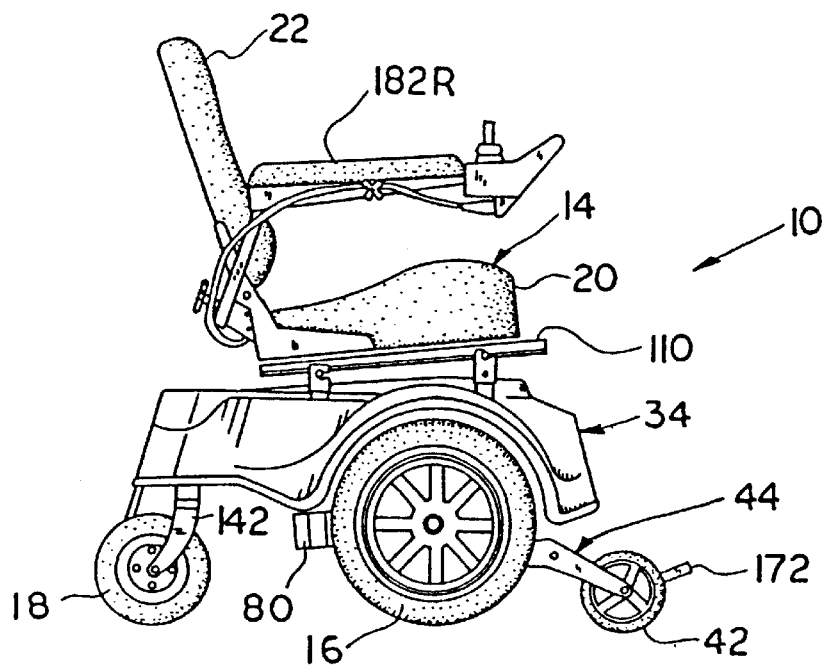
FIG. 8 is a right side view of a prototype power wheelchair as shown in FIGS. 1 through 7 manifesting aspects of the invention, but not equipped with optional lights.
Figure 9:
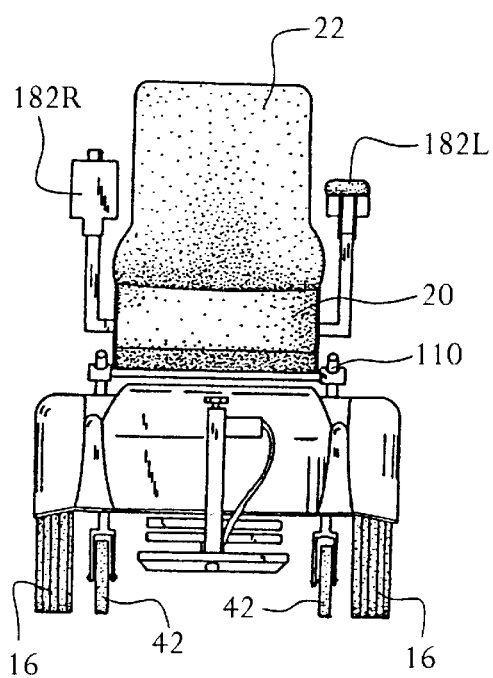
FIG. 9 is a front view of a power wheelchair shown in FIG. 8 manifesting aspects of the invention.

Footrest 172 includes an upstanding lip, which is best illustrated in FIG. 7 of the drawings and is seen from the side in FIG. 14. This lip is designated generally 264. An aperture through the rear portion of lip 264, located at the transverse mid-point thereof, is a tapped aperture. A correspondingly threaded shaft is provided for complemental threaded engagement with the tapped aperture in lip 264.

The threaded shaft, which is designated generally 266, abuttingly contacts a plate-like downward extension portion of the part of open box-like frame 256 which faces forwardly. This downward plate-like extension covers the vertically elongated slot in the forwardly facing surface of vertically extending member 200 and provides a place for abutment of threaded shaft 266. By rotating threaded shaft 266, thereby advancing or retracting threaded shaft 266 relative to lip 264, a greater or lesser portion of shaft 266 extends from the rear of lip 264 to contact the downward plate-like extension of the forwardly facing portion of open box-like frame 256. This provides adjustment of the angular position of footrest 172.

Preferably cushion portion 20 of seat 14 is 17 inches wide. Back portion 22 of seat 14 is preferably 16 inches high in the embodiment illustrated in FIGS. 14 through 20. In the embodiment illustrated in FIGS. 1 through 13 back portion 22 of seat 14 is 18 or 19 inches high.

In the embodiment illustrated in FIGS. 14 through 20 the longitudinal length of cushion portion 20 of seat 14 is preferably between 16 and 18 inches, most preferably 16 inches. Using seat height adjustment means provided by forward and rear upstanding seat support members 96, 98 permits adjustment of the height of seat 14 from about 16 and one-half inches to about 18 and one-half inches, measured from the bottom of seat 14 to the surface on which power wheelchair 10 rests.

Drive wheels 16 are preferably fourteen inch (14") diameter drive wheels. Rear idler wheels 18 are preferably eight inch (8") diameter wheels. Second idler wheels which are the forward anti-tip wheels, are preferably six inch (6") diameter. Power wheelchair 10 preferably has an overall length of thirty-nine and one-half inches (39½") and a width of twenty-five and four-tenths inch (25⁴⁄₁₀"). This results in the vehicle having a turning radius of nineteen and one-half inches (19½") permitting power wheelchair 10 to be used easily in an indoor environment, including those that have not been modified to accommodate handicapped personnel and conventional wheelchairs.

Power wheelchair control is effectuated utilizing a joystick controller designated generally 196 in the drawings. The joystick controller is supplied by Penny & Giles in Cristchurch, England, and is custom programmable and adjustable to provide variable sensitivity for the user.

The geometry provided by the arrangement of the frame, seat, drive motors, drive wheels, idler wheels and tilt wheels provides outstanding handling and control as a result of weight distribution of the vehicle being very low.

In the preferred embodiment of the invention illustrated in FIGS. 14 through 20, with body 34 in place on frame 12 the center of gravity of power wheelchair 10 when power wheelchair 10 is empty is about one and nine-tenths inches (1⁹⁄₁₀") above the axis of rotation of drive wheels 16. Further, the center of gravity of wheelchair 10 when wheelchair 10 is empty in the preferred embodiment illustrated in the aforementioned drawing figures is about 3.1 inches behind the axis of rotation of drive wheels 16.

With the aforementioned dimensions of the preferred embodiment, when wheelchair 10 is empty, the center of gravity wheelchair 10 is about 15.2% of the longitudinal distance the axis of drive wheels 16 and rear idler wheels 18.

The longitudinal location of the center of gravity found to be 15.62 inches behind the axis of the forward anti-tip wheels 42, was located experimentally by hanging a fully equipped wheelchair in the preferred embodiment of the invention as illustrated in the aforementioned drawings, from the ceiling by its upper frame members. The connection point to the upper frame members was moved forward and backwards, longitudinally, in small increments until the balance point was located.

The vertical component of the center of gravity was determined using the Federal Aviation Administration approved method which is commonly used as a preflight determination of changes in center of gravity of aircraft due to fuel, baggage, passenger and pilot loading and load changes. This method is set forth in many references, one of which is the *An Invitation To Fly—Basics for the Private Pilot* by Dennis Glaeser, Sanford Gum and Bruce Walters published by Wadsworth Publishing Company of Belmont, Calif., Copyright 1989, the disclosuer of which is hereby incorporated by reference. Table 1 provides the results of the calculations using this method to determine the vertical location of the center of gravity of the power wheelchair in the preferred embodiment.

TABLE 1

| Items | Aft Datum | Weight | Moment |
|---|---|---|---|
| Back Rest | 28.25 | 4.44 | 125.43 |
| Arm Rest w/ Upright & Joystick | 22.64 | 6.78 | 153.4992 |
| Arm Rest w/Upright | 22.64 | 4.9 | 110.936 |
| Foam Base Cushion | 16.82 | 4.25 | 71.485 |
| Seat Frame w/Plastic Base | 14.78 | 7.32 | 108.1856 |
| Rear Articulation Arm | 9.1 | 3.22 | 29.302 |
| Charger | 8.97 | 3.64 | 32.6508 |
| Rear Forks | 8.77 | 1.56 | 13.6812 |
| Frame Center | 8.27 | 28.06 | 232.0562 |
| Batteries | 7.7 | 96.8 | 745.36 |
| Module | 7.58 | 4.28 | 32.4424 |
| Main Drive Wheels | 6.55 | 18.4 | 120.52 |
| Drive Motors | 5.32 | 30.24 | 160.8768 |
| Front Forks | 4.37 | 3.28 | 14.3336 |
| Footrest | 3.79 | 3.2 | 12.128 |
| Rear Wheel Casters | 3.6 | 2.64 | 9.504 |
| Front Wheels | 3.5 | 1.16 | 4.06 |
| Totals | 188.65 | 224.17 | 1976.4548 |

Center Of Gravity Aft Datum: 8.816767632

What is claimed is:

1. A power wheelchair comprising:
   a. a frame;
   b. a seat mounted on said frame;
   c. a Dair of drive wheels positioned on opposite side of the frame;
   d. a pair of drive motors, one of said drive motors operatively associated with one of said drive wheels;
   e. battery means for supplying power to said drive motors;
   f. castor wheels for supporting the wheelchair on the ground along with said drive wheels; and
   g. means for controlling the operation of the drive motors and the motion of the wheelchair; and
   h. means for adjusting seat height and tilt respecting said frame without use of tools comprising
      i. front and rear seat support means longitudinally spaced from one another and connected to said frame; and
      ii. means for fixing said front and rear seat support means independently among a plurality of vertical positions respecting said frame.

2. The power wheelchair of claim 1 wherein said seat support means further comprises means for detachably coupling with said seat.

3. The power wheelchair of claim 2 wherein said detachable coupling means further comprises: latch means for retaining said seat in fixed connection with at a wheelchair user occupying said seat, and for releasing said seat from said coupled seat support member(s) responsively to application of manually generated and applied axially-oriented force to said latching means.

4. A power wheelchair comprising:
   a. a frame;
   b. a seat including a pair of arms, one arm positioned on either side of the seat;
   c. means for adjustably transversely separatingly positioning said arms thereby to adjustably select effective seat width, said means comprising
      i. an arm support base,
      ii. arm support extensions connected to said arm support base and movable transversely therealong, and
      iii. means for adjustably fixing said arm support extensions respecting said arm support base by application of manual force thereto without the use of tools;
   d. a pair of drive wheels, one drive wheel positioned on opposite sides of the frame;
   e. an electric motor associated with each drive wheel;
   f. a battery for supplying electric power to the motors;
   g. a controller for controlling operation of the motors and thus the movement of the wheelchair; and
   h. a pair of castor wheels which along with the drive wheels support the wheelchair during movement.

5. The power wheelchair of claim 4 wherein said means for adjustably transversely separatingly positioning said arms positions said arms along a continuum of positions.

6. The power wheelchair of claim 4 wherein said means for adjustably transversely separatingly positioning said arms is operable by application of manual rotary force thereto.

7. A power wheelchair of the type having apair of drive wheels and a pair of castor wheels for supporting the wheelchair movement and having a pair of electric powered drive motors for operatively rotating the drive wheels in a manner controlled by the occupant of the wheelchair, the wheelchair comprising:
   a. a frame;
   b. a seat. the seat comprising a seat cushion portion and a seat back portion, the seat further including pair of arms, one arm positioned on either side of the seat;
   c. means connecting said seat to said frame for manually adjusting seat cushion height and tilt respecting said frame without use of tools; and
   d. means for manually adjustably positioning at least one of said arms along a continuum of positions thereby to adjustably select effective seat width without use of tools.

8. The power wheelchair of claim 7 wherein said seat height and tilt adjusting means further comprises:
   a. front and rear seat support members connecting to and being movable upwardly respecting said frame independently of one another; and
   b. means for manually fixing said front and rear seat support members independently at selected ones of a plurality of positions above said frame.

9. The power wheelchair of claim 7 wherein said arm transverse positioning means further comprises:
   a. an arm support base;
   b. an arm support extension connected to;aid arm support base and movable transversely therealong;
   c. means for adjustably fixing said arm support extension respecting said arm support base at a selected location among said continuum of positions along said arm support base by application of manual force thereto without use of tools.

10. A power wheelchair comprising:
    a. a frame;
    b. a seat;
    c. resilient latch means for retaining said seat fixed on said frame upon application of downward force to said seat such as by a user occupying said seat and releasing said seat from said frame responsively to application of manual axially oriented force without use of tools;
    d. a pair of drive wheels positioned on opposite sides of the frame;
    e. castor means for supporting the wheelchair on the ground along with the drive wheels;
    f. motor means associated with each of the drive wheels;
    g. battery means for supplying power to the molor means; and
    h. a controller for operatively controlling the operation of the motor means for directing the powered movement and steering of the wheelchair.

11. A power wheelchair including a frame, two drive wheels, said drive wheels positioned on opposite sides of the frame, a pair of castor wheels, drive motors operatively connected to the respective drive wheels for powered movement of the wheelchair, a controller for controlling the movement of the wheelchair, and at least one battery for supplying power to the motors, the wheelchair comprising:
    means for releasably supporting a seat above the frame, and said frame comprising
      i. upwardly extending transversely spaced rear seat support members;
      ii. upwardly extending transversely spaced forward seat support members;
      iii. said seat support members including hooking members movable to an orientation that mouth portions of said hooking members are upwardly open thereby to release members resident therewithin upon upward force application thereto.

12. The power wheelchair of claim 11 wherein said seat comprises a subframe having
    a. a pair of tubular members;
    b. spring means within said tubular members;
    c. rod members slidably resident within said tubular members;
    d. said spring means biasing said rod members towards an end of said tubular members;
    e. said tubular members having downwardly facing slots for receiving said hooking members, said downwardly facing slots having said rod members extending transversely thereacross for engagement by said hooking members.

13. The power wheelchair of claim 12 wherein said seat subframe further comprises a longitudinally extending portion connecting the pair oftubular members and wherein said rear seat support members include means for receiving longitudinally extending portion of said subframe there between, said receiving means having forwardly opening longitudinal slots formed therewithin adapted to receive respective ends of said transversely extending rod members of said subframe.

14. The power wheelchair of claim 12 wherein said forward seat support members further comprises transversely spaced vertically upstanding walls, said walls associated with each of said forward seat supports being connected at respective bases to the associated vertically upstanding forward seat support, said walls being spaced apart one from another sufficiently to receive said longitudinally extending tubular portions of said subframe therebetween, said forward seat support portions further including shafts running transversely between said separated walls proximate the bases thereof, said open hooks mounted on said shafts for rotation relative thereto and further including spring means mounted on said shaft for biasing said open hooks forwardly, at least one of said upstanding walls of said forward seat support portions including an aperture adapted to receive a transverse shaft portion affixed to a forward portion of said longitudinal tube forming a part of said subframe.

15. The power wheelchair of claim 10 further comprising:
a wheelchair body supported by said frame, said body comprising
  a. a central portion;
  b. fender portions wrapping around said drive wheels;
  c. a portion extending downwardly from said openable bonnet portion for concealing the rear suspension of said scooter;
  d. rear corners of said body being rounded and running over idler wheel suspension gear;
  e. said rear corners and said fender portions transitioning to said central portion via at least partially concave transition portions running longitudinally along said central portion;
  f. a pair of forwardly facing integral bumper members lying over and protecting front anti-tilt wheel suspension members; and
  g. a planner portion extending between said forward bumper members providing a kick panel for the powered wheelchair occupant.

16. The power wheelchair of claim 15 wherein said body is a unitary piece of plastic.

17. A power wheelchair comprising:
  a. a frame;
  b. a seat;
  c. means, operable responsively to manual force, for releasably connecting said seat to said frame without use of tools;
  d. drive wheels connected to said frame and rotatable about transverse axes below a portion of said seat supporting a chair occupant's thighs;
  e. at least one ground engaging idler wheel connected to said frame behind said drive wheels;
  f. motors for rotating respective drive wheels, connected to and pivotally movable respecting said frame upon an associated drive wheel moving vertically;
  g. means for independently mountingly suspending said drive wheel/motor combinations respecting said frame;
  h. a decorative body for protecting electrochemical means, carried by said frame and providing energy to said motors, from spills and shielding said electrochemical means from a user of said power wheelchair, said body being supported by said frame and manually directly liftable off of said frame without use of tools;
  i. means for adjusting height and tilt of said seat respecting said frame without use of tools;
  j. means for adjustably transversely separatingly positioning arms of said seat to adjustably select effective seat width without use of tools;
  k. a footrest for supporting the feet of an occupant of said seat, connected to said frame;
  l. means for adjustably vertically positioning said footrest respecting said frame; and
  m. means for adjustably positioning said footrest at an angle to the horizontal.

18. A power wheelchair having means for releasably supporting a seat above a frame, the wheelchair comprising:
  a. a frame;
  b. a seat;
  c. a pair of drive wheels rotatable about transverse axes below said seat;
  d. at least one idler wheel, the idler wheel and drive wheels supported on the frame;
  e. motor means for driving said drive wheels;
  f. upwardly extending transversely spaced rear seat support members positioned on a rear portion of said frame and adapted to releasably support a rear portion of the seat, said rear seat support members independently moveable vertically with respect to the frame;
  g. upwardly extending transversely spaced forward seat support members positioned on a forward portion of said frame and adapted to releasably support a front portion of the seat, said forward seat support members independently moveable vertically with respect to the frame; and
  h. said forward seat support members including moveable hooking members for releasably connecting said seat to said frame, the hooking members adapted to release the seat upon application of an upward force.

19. A power wheelchair as claimed in claim 14 wherein said rear seat support members comprise a horizontally disposed slots for receiving a portion of the seat.

20. A power wheelchair as claimed in claim 19 wherein said slots on said rear support members are facing forward of the wheelchair.

21. A power wheelchair comprising:
a frame;
a seat;
a pair of drive wheels positioned on opposite sides of the frame rotatable about transverse axes;
at least one idle wheel, the drive wheels and idler wheel supported on the frame;
at least one motor for driving said drive wheels for powered movement of the wheelchair;
means for controlling the powered movement of the wheelchair by the motor;
a battery for supplying power to the motor;
a plurality of upwardly extending seat support members for releasably supporting said seat above said frame, said support members independently adjustable vertically with respect to said frame for relative adjustment for the height and tilt of said seat.

22. A power wheelchair as claimed in claim 20 wherein the plurality of seat support members comprise rear seat support members and forward seat support members.

23. A power wheelchair as claimed in claim 20 wherein the drive wheels axes are positioned below a central portion of said seat when supported by said support members.

24. A power wheelchair as claimed in claim 22 wherein the idler wheel is positioned behind the drive wheels and rearward of the seat.

25. A power wheelchair as claimed in claim 23 wherein the idler wheel is mounted for rotating about a horizontal axis and supported for rotational movement about a vertical axis.

26. A power wheelchair as claimed in claim 34 further comprising anti-tip wheels positioned forward of the drive wheels.

27. A power wheelchair as claimed in claim 25 wherein the forward anti-tip wheels are resiliently supported on the frame.

28. A power wheelchair as claimed in claim 25 wherein the forward anti-tip wheels are positioned off the ground when the drive wheels and idler wheels are in the normal ground engaging position on level ground.

* * * * *